United States Patent
Ko et al.

(10) Patent No.: US 11,910,742 B2
(45) Date of Patent: Feb. 27, 2024

(54) MOVING ROBOT, SYSTEM OF MOVING ROBOT AND METHOD FOR MOVING TO CHARGING STATION OF MOVING ROBOT

(71) Applicant: LG ELECTRONICS INC., Seoul (KR)

(72) Inventors: Kyoungsuk Ko, Seoul (KR); Byungjin Kim, Seoul (KR); Sungwook Lee, Seoul (KR); Hyungsub Lee, Seoul (KR); Koh Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 17/265,671

(22) PCT Filed: Aug. 2, 2019

(86) PCT No.: PCT/KR2019/009642
§ 371 (c)(1),
(2) Date: Feb. 3, 2021

(87) PCT Pub. No.: WO2020/027610
PCT Pub. Date: Feb. 6, 2020

(65) Prior Publication Data
US 2021/0302986 A1    Sep. 30, 2021

Related U.S. Application Data

(60) Provisional application No. 62/714,088, filed on Aug. 3, 2018.

(30) Foreign Application Priority Data

Apr. 30, 2019    (KR) ........................ 10-2019-0050956

(51) Int. Cl.
*A01D 34/00*    (2006.01)
*B60L 53/36*    (2019.01)
(Continued)

(52) U.S. Cl.
CPC ............ *A01D 34/008* (2013.01); *B60L 53/36* (2019.02); *G05D 1/0094* (2013.01);
(Continued)

(58) Field of Classification Search
CPC ..... A01D 34/008; A01D 2101/00; A47L 9/00; A47L 2201/04; G05D 1/0094;
(Continued)

(56) References Cited

U.S. PATENT DOCUMENTS 6,764,373 B1    7/2004  Osawa et al.
7,206,677 B2    4/2007  Hulden
(Continued)

FOREIGN PATENT DOCUMENTS

CN    106171248 A    12/2016
CN    108142070 A    6/2018
(Continued)

OTHER PUBLICATIONS

English Translation of KR 100664043B1, Accessed Nov. 29, 2022.*
(Continued)

*Primary Examiner* — Jeff A Burke
*Assistant Examiner* — Blake A Wood
(74) *Attorney, Agent, or Firm* — Birch, Stewart, Kolasch & Birch, LLP

(57) ABSTRACT

The present disclosure relates to a moving robot, a moving robot system, and a method for moving to a charging system of the moving robot, wherein the moving robot moves to the charging system based on a reception result obtained by receiving a plurality of transmission signals transmitted from the charging station and a sensing result obtained by sensing a magnetic field state.

16 Claims, 15 Drawing Sheets

(51) Int. Cl.
*G05D 1/00* (2006.01)
*G05D 1/02* (2020.01)
*A01D 101/00* (2006.01)
*A47L 9/00* (2006.01)

(52) U.S. Cl.
CPC ......... *G05D 1/0225* (2013.01); *G05D 1/0259* (2013.01); *G05D 1/0265* (2013.01); *G05D 1/0274* (2013.01); *G05D 1/0276* (2013.01); *G05D 1/0278* (2013.01); *A01D 2101/00* (2013.01); *A47L 9/00* (2013.01); *A47L 2201/04* (2013.01); *B60L 2200/40* (2013.01); *G05D 2201/0203* (2013.01); *G05D 2201/0208* (2013.01); *G05D 2201/0215* (2013.01)

(58) Field of Classification Search
CPC .. G05D 1/0225; G05D 1/0259; G05D 1/0265; G05D 1/0274; G05D 1/0276; G05D 1/0278; G05D 1/0246; G05D 1/027; G05D 1/028; G05D 2201/0203; G05D 2201/0208; G05D 2201/0215; B60L 53/36; B60L 58/12; B60L 2260/0215; B25J 11/008; B25J 5/007; B25J 19/005; B25J 11/0085; B25J 9/1664; B25J 19/02; Y02T 10/70; Y02T 10/7072; Y02T 90/12; Y02T 90/16
See application file for complete search history.

(56) References Cited

U.S. PATENT DOCUMENTS

| | | | |
|---|---|---|---|
| 8,433,468 B2 * | 4/2013 | Johnson ................ | B60L 53/14 701/519 |
| 8,838,291 B2 | 9/2014 | Jägenstedt et al. | |
| 8,942,862 B2 | 1/2015 | Markusson et al. | |
| 8,996,171 B2 | 3/2015 | Anderson et al. | |
| 9,375,842 B2 | 6/2016 | Shamlian et al. | |
| 9,471,063 B2 | 10/2016 | Ouyang | |
| 9,740,204 B2 | 8/2017 | Yamamura et al. | |
| 9,788,153 B1 | 10/2017 | Newstadt et al. | |
| 10,365,661 B2 | 7/2019 | Jägenstedt et al. | |
| 10,383,497 B2 * | 8/2019 | Han .................... | A47L 11/4011 |
| 2006/0149465 A1 | 7/2006 | Park et al. | |
| 2007/0050086 A1 * | 3/2007 | Lim .................... | G05D 1/0242 700/245 |
| 2009/0043462 A1 | 2/2009 | Stratton et al. | |
| 2099/0043462 | 2/2009 | Stratton et al. | |
| 2010/0168934 A1 | 7/2010 | Ball et al. | |
| 2011/0237274 A1 | 9/2011 | Wong et al. | |
| 2012/0293371 A1 | 11/2012 | Lu | |
| 2013/0025248 A1 * | 1/2013 | Kraft .................... | A01D 34/008 701/25 |
| 2013/0041526 A1 | 2/2013 | Ouyang | |
| 2013/0218397 A1 * | 8/2013 | Griffini ................ | G05D 1/027 701/26 |
| 2014/0196967 A1 | 7/2014 | Chang et al. | |
| 2015/0032320 A1 | 1/2015 | Bernini | |
| 2015/0328775 A1 | 11/2015 | Shamlian et al. | |
| 2015/0366129 A1 * | 12/2015 | Borinato ............. | G05D 1/0278 701/25 |
| 2016/0026185 A1 | 1/2016 | Smith et al. | |
| 2016/0059875 A1 | 3/2016 | Segman et al. | |
| 2016/0100522 A1 | 4/2016 | Yamauchi et al. | |
| 2016/0174459 A1 | 6/2016 | Balutis et al. | |
| 2016/0231749 A1 | 8/2016 | Shimamura | |
| 2016/0282870 A1 | 9/2016 | Yamamura et al. | |
| 2016/0363933 A1 | 12/2016 | Balutis et al. | |
| 2016/0366818 A1 | 12/2016 | Ouyang | |
| 2016/0370804 A1 | 12/2016 | Suh | |
| 2016/0377688 A1 * | 12/2016 | Kleiner ................ | G01S 1/00 324/202 |
| 2016/0379164 A1 | 12/2016 | Li | |
| 2017/0026818 A1 | 1/2017 | Beaulieu et al. | |
| 2017/0039860 A1 | 2/2017 | Just | |
| 2017/0050659 A1 | 2/2017 | Cardano et al. | |
| 2017/0127608 A1 * | 5/2017 | Biber .................. | G05D 1/0255 |
| 2017/0139419 A1 | 5/2017 | Jägenstedt et al. | |
| 2017/0150676 A1 | 6/2017 | Yamauchi et al. | |
| 2018/0081366 A1 | 3/2018 | Tan et al. | |
| 2018/0173223 A1 | 6/2018 | Doane et al. | |
| 2018/0267136 A1 | 9/2018 | Zhong et al. | |
| 2019/0025847 A1 | 1/2019 | Mannefred et al. | |
| 2019/0208979 A1 | 7/2019 | Bassa et al. | |
| 2019/0212730 A1 | 7/2019 | Jones et al. | |
| 2019/0337155 A1 | 11/2019 | Kwak et al. | |
| 2019/0387680 A1 | 12/2019 | Jägenstedt et al. | |
| 2020/0037498 A1 | 2/2020 | Ko et al. | |
| 2020/0037499 A1 | 2/2020 | Ko et al. | |
| 2020/0041601 A1 | 2/2020 | Ko et al. | |
| 2021/0037703 A1 | 2/2021 | Holgersson | |

FOREIGN PATENT DOCUMENTS

| | | |
|---|---|---|
| CN | 108307767 A | 7/2018 |
| DE | 102015218225 A1 | 4/2016 |
| EP | 2732687 A1 | 5/2014 |
| EP | 3073346 A1 | 9/2016 |
| EP | 3200040 A1 | 8/2017 |
| FR | 3043304 A1 | 5/2017 |
| JP | 2017-531423 A | 10/2017 |
| KR | 2001-0009583 A | 2/2001 |
| KR | 10-2004-0081629 A | 9/2004 |
| KR | 10-2004-0063248 A | 6/2005 |
| KR | 10-0575706 B1 | 5/2006 |
| KR | 10-2007-0012119 A | 1/2007 |
| KR | 10-0664043 B1 | 1/2007 |
| KR | 2007-0012119 A | 1/2007 |
| KR | 2007-0093703 A | 9/2007 |
| KR | 100664043 B1 * | 10/2007 |
| KR | 10-2007-0109748 A | 11/2007 |
| KR | 10-2007-0061218 A | 12/2007 |
| KR | 10-2009-0011418 A | 4/2010 |
| KR | 10-2014-0066850 A | 6/2014 |
| KR | 10-2015-0125508 A | 11/2015 |
| KR | 10-2016-0026293 A | 3/2016 |
| KR | 10-2016-0128124 A | 11/2016 |
| KR | 10-2016-0133348 A | 11/2016 |
| KR | 10-2016-0136131 A | 11/2016 |
| KR | 10-2016-0149562 A | 12/2016 |
| KR | 10-1742913 B1 | 6/2017 |
| KR | 10-2017-0082006 A | 7/2017 |
| KR | 10-2017-0082016 A | 7/2017 |
| KR | 10-2014-0073657 A | 8/2017 |
| KR | 10-2018-0038879 A | 4/2018 |
| KR | 10-2018-0085309 | 7/2018 |
| KR | 10-2018-0069237 | 8/2018 |
| WO | WO 03/104909 A1 | 12/2003 |
| WO | WO 2015/072896 A1 | 5/2015 |
| WO | WO 2015/192902 A1 | 12/2015 |
| WO | WO 2016/000734 A1 | 1/2016 |
| WO | WO 2016/057140 A1 | 4/2016 |
| WO | WO 2016/097900 A1 | 6/2016 |
| WO | WO 2016/160376 A1 | 10/2016 |
| WO | WO 2017/015554 A1 | 1/2017 |
| WO | WO 2018/108179 A1 | 6/2018 |
| WO | WO 2018/132048 A1 | 7/2018 |

OTHER PUBLICATIONS

Extended European Search Report in EP Application No. 21193991.3 dated Jan. 18, 2022 (8 pages).
U.S. Appl. No. 17/265,590, filed Feb. 3, 2021, Kyoungsuk Ko et al.
U.S. Appl. No. 17/265,633, filed Feb. 3, 2021, Kyoungsuk Ko et al.
U.S. Appl. No. 17/265,613, filed Feb. 3, 2021, Kyoungsuk Ko et al.
U.S. Appl. No. 16/526,314, filed Jul. 30, 2019, Kyoungsuk Ko et al.
U.S. Appl. No. 16/526,260, filed Jul. 30, 2019, Kyoungsuk Ko et al.
U.S. Appl. No. 16/531,222, filed Aug. 5, 2019, Kyoungsuk Ko et al.
Notice of Allowance received from the Korean Intellectual Property Office in Korean Application No. 10-2019-0012994, dated Mar. 22, 2021 (3 pages).

(56) References Cited

OTHER PUBLICATIONS

Notice of Allowance received from the Korean Intellectual Property Office in Korean Application No. 10-2019-0050956, dated Jul. 19, 2021 (2 pages).
Notice of Allowance received from the Korean Intellectual Property Office in Korean Application No. 10-2019-0050959, dated May 27, 2021 (2 pages).
Korean Office Action of Application No. KR 10-2019-0050956, dated Nov. 15, 2020.
International Search Report, dated Nov. 21, 2019 listing PCT/KR2019/009608.
International Search Report, dated Nov. 21, 2019 listing PCT/KR2019/009642.
International Search Report, dated Nov. 21, 2019 listing PCT/KR2019/009643.
Australian Office Action of Application No. AU2019208265, dated May 6, 2020 (6 pages).
Li Z. et al., An Approach to Improve the Positioning Performance of GPS/INS/UWB Integrated System with Two-Step Filter, Remote Sensing 2018, 10(1), 19, published Dec. 23, 2017 (14 pages).
Australian Office Action of Application No. AU2019210641, dated Oct. 8, 2020 (7 pages).
Extended European Search Report of Application No. EP19189643, dated Dec. 20, 2019 (6 pages).
Extended European Search Report of Application No. EP19189641, dated Dec. 17, 2019 (8 pages).
Extended European Search Report of Application No. EP19189646, dated Apr. 24, 2020 (10 pages).
Leonard, John J. et al., Mobile Robot Localization by Tracking Geometric Beacons, IEEE Transactions on Robotics and Automation, vol. 7, No. 3, published Jun. 3, 1991 (7 pages).
Korean Office Action of Application No. KR10-2019-0012989, dated Jul. 9, 2020 (17 pages).
Korean Notice of Allowance of Application No. KR10-2019-0012989, dated Jan. 25, 2021 (2 pages).
Korean Office Action of Application No. KR10-2019-0050956, dated Nov. 15, 2020 (9 pages).
Korean Office Action of Application No. KR10-2019-0050961, dated Nov. 16, 2020 (5 pages).
Korean Office Action of Application No. KR10-2019-0012990, dated Jul. 9, 2020 (14 pages).
Korean Office Action of Application No. KR10-2019-0012994, dated Jul. 25, 2020 (19 pages).
Korean Office Action of Application No. KR10-2019-0050966, dated Nov. 20, 2020 (7 pages).
International Search Report of PCT Application No. PCT/KR2019/009257, dated Nov. 19, 2019 (1 page).

\* cited by examiner

MOVING ROBOT, SYSTEM OF MOVING ROBOT AND METHOD FOR MOVING TO CHARGING STATION OF MOVING ROBOT

CROSS-REFERENCE TO RELATED APPLICATION

This application is the National Stage filing under 35 U.S.C. 371 of International Application No. PCT/KR2019/009642, filed on Aug. 2, 2019, which claims the benefit of earlier filing date and right of priority to U.S. Provisional Application No. 62/714,088 filed Aug. 3, 2018 and Korean Application No. 10-2019-0050956, filed on Apr. 30, 2019, the contents of which are all hereby incorporated by reference herein in their entirety.

BACKGROUND

1. Field

The present disclosure relates to a moving robot that autonomously travels, a moving robot system, and a method for moving to a charging station of the moving robot.

2. Description of the Related Art

Generally, a moving robot is a device that automatically performs a predetermined operation while traveling by itself in a predetermined area without a user's operation. The moving robot senses obstacles installed in the predetermined area and performs its operations by moving close to or away from such obstacles.

Such a moving robot may include a cleaning robot that carries out cleaning while traveling in the predetermined area, as well as a lawn mower robot that mows a lawn on a bottom of the predetermined area. Generally, lawn mower devices include a riding-type device on which a user rides and which moves according to a user's operation to cut a lawn or perform weeding, and a work-behind type or hand type device that is manually pushed or pulled by the user and moves and cuts a lawn. As the lawn mower devices move and cut a lawn according to direct operations by a user, the user may inconveniently operate the device directly. Accordingly, researches have been conducted on a moving robot-type mower device including elements that cuts a lawn. However, since a lawn mower robot operates outdoors as well as indoors, there is a need to set an area in which the lawn mower robot is to move. In detail, since an outdoor area is an open space unlike an indoor area, the area in which the lawn mower robot is to move needs to be designated in the outdoor area in advance, and the area needs to be limited so that the lawn mower robot travels in a place in which the lawn is planted.

As a prior art of the lawn mower device, the Korean Laid-Open Patent Publication No. 10-2015-0125508 (disclosed on Nov. 9, 2015) (hereinafter referred to as prior art document 1) discloses technology of burying a wire in a lawn-planted area to set an area in which the lawn mower robot is to move, to thereby control the moving robot to move in an inner area with reference to the wire. Then, a boundary for the moving robot is set based on a voltage value induced by the wire. However, although such a method for using a wire makes it easy to recognize a position of a boundary portion of a travel area and perform traveling, there is a limit in improving position recognition and traveling in a wide travel area within the boundary portion.

In addition, US Publication No. 2017-0150676 (published on Jun. 1, 2017) (hereinafter referred to as prior art document 2) discloses technology of installing a plurality of beacons at a boundary portion of a travel area, determining a relative position of a robot with respect to the plurality of beacons, based on signals transmitted from the plurality of beacons while the robot is traveling along a boundary, and storing coordinate information and using the coordinate information to determine a position. That is, in prior art document 2, the robot transmits and receives signals with the plurality of beacons provided in the boundary portion of the travel area in a distributed manner, the travel area is set based on a result of the transmission and reception, and thus, accurate travel area/position recognition is performed using relative position information with respect to the plurality of beacons. Accordingly, a restriction on position recognition that was a limit in prior art document 1 may be partially resolved.

In addition, since a moving robot for lawn mowing operates outdoors instead of indoors, there may be many constraints in traveling. For example, due to characteristics of a wide open outdoor area, it may be difficult to search for a position of a charging station and accurately determine a position of the moving robot. This may lead to constraints on performance of communication between the charging station and the moving robot. Thus, it may become difficult to determine the positions of the charging station and the moving robot via the communication. In addition, due to various factors such as terrain/objects, it may become difficult to travel to return to the charging station.

In order to solve such a problem, a method in which the moving robot performs traveling until it finds a position of the charging station or reaches a boundary area in which a travel area may be recognized, and thus, determines a position of the charging station according to a result of the traveling, and then, returns to the charging station was proposed. However, this method had a limit in that it was difficult for the moving robot to quickly return to the charging station in a wide outdoor environment. For example, as time for returning to the charging station increased due to unnecessary traveling, there were concerns that driving power might be discharged before the moving robot returns to the charging station, that the moving robot becomes further away from the charging station while traveling to find a position of the charging station, or the like.

That is, generally, return travel of the moving robot to the charging station was not accurately/properly/easily performed. Accordingly, driving power of the moving robot was not easily charged. Due to these problems, operation performance of a lawn mower robot traveling in a wide outdoor environment was limited, and there was a limit in ensuring reliability, reliability, utilization, and effectiveness of the lawn mower robot.

SUMMARY

Therefore, an aspect of the present disclosure is to overcome limitations of the related art described above.

In detail, an aspect of the present disclosure is to provide a moving robot, a moving robot system, and a method for moving to a charging station of the moving robot using specifications of communication between the moving robot and the charging station.

Also, another aspect of the present disclosure is to provide a moving robot, a moving robot system, and a method for moving to a charging station of the moving robot, wherein the moving robot may move to the charging station via an optimum path to the charging station even under a specific communication condition and accurately dock on the charging station.

In addition, another aspect of the present disclosure is to provide a moving robot, a moving robot system, and a method for moving to a charging station of the moving robot, wherein the moving robot may move to and dock on the charging station even when the moving robot may not accurately move to the charging station.

Particularly, another aspect of the present disclosure is to provide a moving robot, a moving robot system, and a method for moving to a charging station of the moving robot, wherein the moving robot includes one communication module, the charging station includes a plurality of communication modules, and the moving robot may quickly and accurately move to the charging station via an optimum path to the charging station, under a communication condition in which a reception angle of a signal may be determined.

In addition, another aspect of the present disclosure is to provide a moving robot, a moving robot system, and a method for moving to a charging station of the moving robot, whereby unnecessary traveling and time to move to the charging station may be reduced.

In order to solve such problems described above, an aspect of the present disclosure is to provide a moving robot, a moving robot system, and a method for moving to a charging station of the moving robot, wherein the moving robot moves to the charging station based on a reception result obtained by receiving a plurality of transmission signals transmitted from the charging station and a sensing result obtained by sensing a magnetic field state.

In detail, the moving robot determines a direction in which the charging station is located, based on the reception result as to the plurality of transmission signals received while the moving robot is traveling in a travel area, determines a traveling direction based on the sensing result, and returns to the charging station using a result of the determination.

Accordingly, in a communication environment in which reception strength and a reception angle of the plurality of transmission signals may be determined, an optimum path to return to the charging station and an accurate traveling direction to dock on the charging station may be determined.

That is, the moving robot, the moving robot system, and the method for moving the moving robot according to the present disclosure may be configured such that a position of the charging station and a traveling direction to dock on the charging station are determined based on the reception result as to the plurality of transmission signals transmitted from the charging station and an analysis result obtained by analyzing a magnetic field state.

An aspect of the present disclosure is to provide the moving robot, the moving robot system, and method for moving to a charging station of the moving robot, wherein a position of the charging station is determined and accurate and optimum movement/docking of the moving robot on the charging station is performed to thereby solve the above-described problems.

The technical features herein may be embodied as a control element of a moving robot, a moving robot system, a control system of the moving robot, a method for controlling the moving robot, and a method for moving to a charging station of the moving robot, a method for determining a moving path of the moving robot, a control element of a lawn mower robot, the lawn mower robot, a lawn mower robot system, a control element of the lawn mower robot, a method for controlling the lawn mower robot, a method for moving the lawn mower robot to the charging station, or a method for controlling traveling of the lawn mower robot, etc. In this specification, embodiments of the moving robot, the moving robot system, and the method for moving to a charging station of the moving robot using the above-described technical features are provided.

To achieve these and other advantages and in accordance with the purpose of this specification, as embodied and broadly described herein, there is provided a moving robot including a main body, a driving unit to move the main body: a receiver to receive a plurality of transmission signals transmitted from a charging station in a travel area: a sensing unit to sense a magnetic field state at a point at which the main body is located: and a controller to control traveling of the main body by controlling the driving unit to travel in the travel area, based on at least one selected from a reception result obtained by the receiver, a sensing result obtained by the sensing unit, and a pre-stored area map, wherein the controller, when the controller controls the main body to move to the charging station, determines a direction in which the charging station is located based on the reception result at a current position of the main body, determines a traveling direction of the main body based on the sensing result at the current position, and controls the main body to move to the charging station according to a result of the determination as to the direction in which the charging station is located and the traveling direction.

To achieve these and other advantages and in accordance with the purpose of this specification, as embodied and broadly described herein, there is also provided a moving robot system including a charging station that is provided in a travel area and transmits a plurality of transmission signals to determine position information: and a moving robot to travel in the travel area based on at least one of a reception result obtained by receiving the plurality of transmission signals, a sensing result obtained by sensing a magnetic field state, and a pre-stored area map, wherein the moving robot, when the moving robot moves to the charging station, determines a direction in which the charging station is located based on the reception result obtained at a current position of the moving robot, determines a traveling direction based on the sensing result obtained at the current position, and moves to the charging station according to a result of the determination as to the direction in which the charging station is located and the traveling direction.

To achieve these and other advantages and in accordance with the purpose of this specification, as embodied and broadly described herein, there is also provided a method for moving to a charging station of a moving robot, wherein the moving robot includes: a main body: a driving unit to move the main body: a receiver to receive a plurality of transmission signals transmitted from the charging station provided in a travel area: a sensing unit to sense a magnetic field state at a point at which the main body is located: and a controller to control traveling of the main body by controlling the driving unit to travel in the travel area, based on at least one selected from a reception result obtained by the receiver, a sensing result obtained by the sensing unit, and a pre-stored area map, the method including: moving a predetermined distance after departing from the charging station: storing docking information regarding a docking point based on the reception result and the sensing result at one point to which movement by the predetermined distance is performed: determining a traveling direction and a direction in which the docking point is located based on the reception result, the sensing result, and the docking information at a current position, after traveling is performed in the travel area: moving to the docking point by switching the traveling direction to the direction in which the docking point is located: determining the traveling direction and the direction in which the charging station is located based on the docking information at the docking point: and moving to the charging station by switching the traveling direction to the direction in which the charging station is located.

The moving robot, the moving robot system, and the moving robot moving method described above, according to the present disclosure, may be implemented as a control element of a lawn mower robot, a lawn mower robot system, a control system of the lawn mower robot, a method for controlling the lawn mower robot, and a method for moving the lawn mower robot to a charging station. However, the technology disclosed in this specification is not limited thereto and may be implemented as any robot cleaner to which the technical idea of the above-described technology can be applied, a control element that controls the robot cleaner, a robot cleaning system, a method for controlling the robot cleaner, etc.

Effects of the Disclosure

A moving robot, a moving robot system, and a method for moving to a charging station of the moving robot according to the present disclosure may be configured such that the moving robot moves to the charging station based on a reception result obtained by receiving a plurality of transmission signals transmitted from the charging station and a sensing result obtained by sensing a magnetic field state, and thus, a path to move to the charging station may be determined and the moving robot may move to the charging station using a specification of communication between the moving robot and the charging station.

Particularly, the moving robot, the moving robot system, and the method for method for moving to a charging station of the moving robot according to the present disclosure may be configured such that, as the robot moves into a predetermined range with reference to the charging station, the robot may move to and dock on the charging station even when the robot is not capable of moving accurately to the charging station.

In addition, the moving robot, the moving robot system, and the method for moving to a charging station of the moving robot according to the present disclosure may be configured such that a docking point is set based on a reception result obtained by receiving a plurality of transmission signals and an analysis result obtained by analyzing a magnetic field state, and the moving robot may move to and dock on the charging station via the docking point. Thus, the moving robot may move to the charging station via an optimum path to the charging station to thereby accurately dock on the charging station.

Accordingly, the moving robot, the moving robot system, and the method for moving to a charging station of the moving robot according to the present disclosure may be configured such that unnecessary traveling and time to move to the charging station may be reduced. and thus, the moving robot may quickly and accurately move to the charging station via the optimum path to the charging station.

That is, the moving robot, the moving robot system, and the moving robot moving method according to the present disclosure have such an effect that movement to and docking on the charging station may be performed accurately, quickly, appropriately, and efficiently.

As a result, the moving robot, the moving robot system, and the moving robot moving method according to the present disclosure have such effects that limitations of the prior art may be resolved, and accuracy, reliability, stability, applicability, efficiency, effectiveness, and utilization in the technical field of moving robots for lawn mowing in which a signal transmission element is utilized/adopted may be enhanced.

DETAILED DESCRIPTION

Figure 1A:
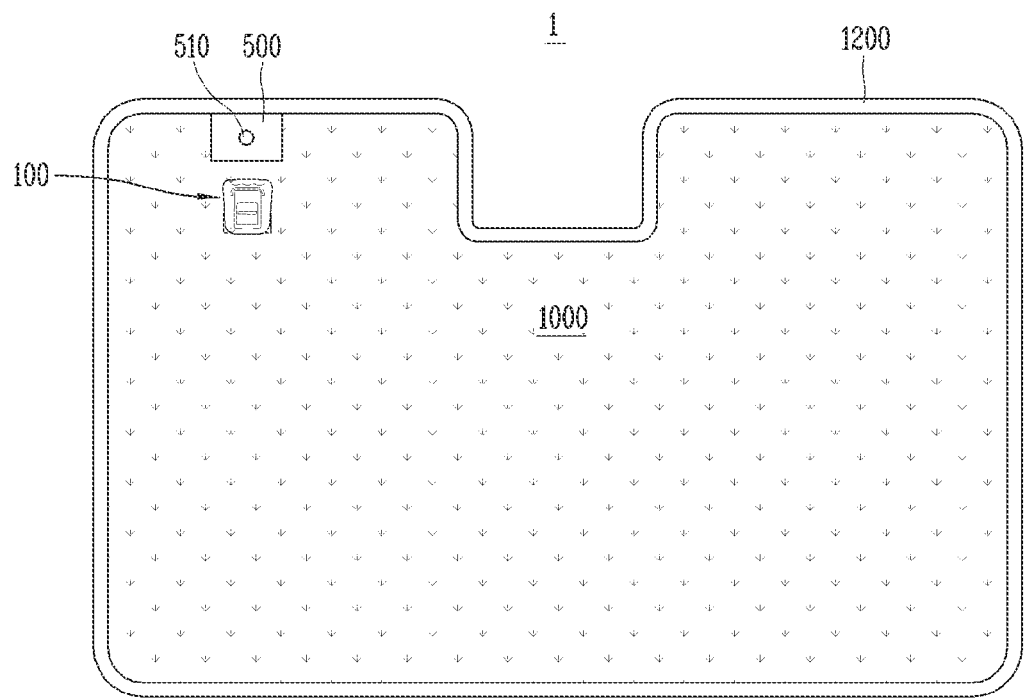
FIG. 1A is a configuration diagram a illustrating an embodiment of a moving robot and a moving robot system according to the present disclosure.

Hereinafter, embodiments of a moving robot, a moving robot system, and a method for moving the moving robot to a charging station according the present disclosure will be described in detail with reference to the accompanying drawings, and the same reference numerals are used to designate the same/like components and redundant description thereof will be omitted.

In describing technologies disclosed in the present disclosure, if a detailed explanation for a related known function or construction is considered to unnecessarily divert the gist of the technologies in the present disclosure, such explanation has been omitted but would be understood by those skilled in the art. It should be noted that the attached drawings are provided to facilitate understanding of the technical idea disclosed in this specification, and should not be construed as limiting the technical idea by the attached drawings.

First, a moving robot 100 (hereinafter referred to as a robot) according to the present disclosure is described.

The robot 100 may refer to a robot capable of autonomous traveling, a lawn mowing moving robot, a lawn mower robot, a lawn mower device, or a moving robot for lawn mowing. As shown in FIG. 1A, the robot 100 travels in a travel area 1000 that is set, and cuts a lawn in the travel area 1000. The robot 100 may operate based on driving power charged by a charging station 500 provided in the travel area 1000 to travel in the travel area 1000 and cut a lawn. When the robot 100 that operates based on driving power charged by the charging station 500 travels in the travel area 1000, and then, moves to the charging station 500, the robot 100 may receive a plurality of transmission signals transmitted from a plurality of signal transmission modules 510a and 510b included in the charging station 500, and move to the charging station 500 based on a reception result obtained by receiving the plurality of transmission signals. The charging station 500 may include the plurality of signal transmission modules 510a and 510b, and the plurality of signal transmission modules 510a and 510b may transmit the plurality of transmission signals, respectively. That is, the charging station 500 may transmit a plurality of transmission signals to the robot 100 via the plurality of signal transmission modules 510a and 510b.

Figure 1B:
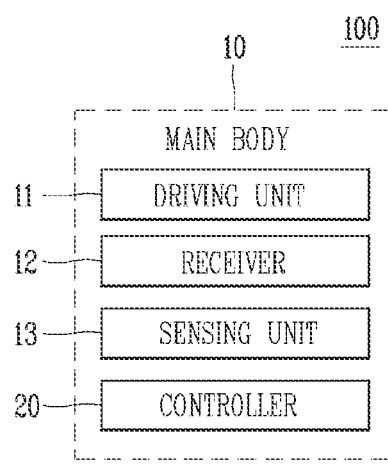
FIG. 1B is a configuration diagram a illustrating a configuration of the moving robot according to the present disclosure.

As shown in FIG. 1B, the robot 100 includes a main body 10, a driving unit 11 that moves the main body 10, a receiver 12 that receives the plurality of transmission signals transmitted from the charging station 500 provided in the travel area 1000, a sensing unit 13 that senses a magnetic field state at a position in which the main body 10 is located, and a controller 20 that controls the driving unit 11 to thereby control traveling of the main body 10 so that the main body 10 travels in the travel area 1000, based on at least one selected from the reception result obtained by the receiver 12, a sensing result obtained by the sensing unit 13 by sensing a magnetic field state, and an area map that is pre-stored.

That is, as the controller 20 controls the driving unit 11 to travel in the travel area 1000 based on at least one selected from the reception result obtained by the receiver 12, the sensing result obtained by the sensing unit 13, and the area map, the robot 100 travels in the travel area 1000.

As such, in the robot 100 including the main body 10, the driving unit 11, the receiver 12, the sensing unit 13, and the controller 20, when the controller 20 controls the main body 10 to move to the charging station 500, the controller 20 determines a direction in which the charging station 500 is located based on the receiving result obtained at a current position of the main body 10, determines a traveling direction of the main body 10 based on the sensing result obtained at the current position, and controls the main body 10 to move to the charging station 500 according to a result of the determination as to the direction in which the charging station 500 is located and the traveling direction.

That is, when the robot 100 moves to the charging station 500 after traveling in the travel area 1000, the robot 100 determines a direction in which the charging station 500 is located based on the reception result and determines a traveling direction of the robot 100 based on the sensing result. Thus, according to a result of the determination as to the direction in which the charging station 500 is located and the traveling direction, the robot 100 switches the traveling direction to the direction in which the charging station 500 is located, and move to the charging station 500.

Figure 1C:
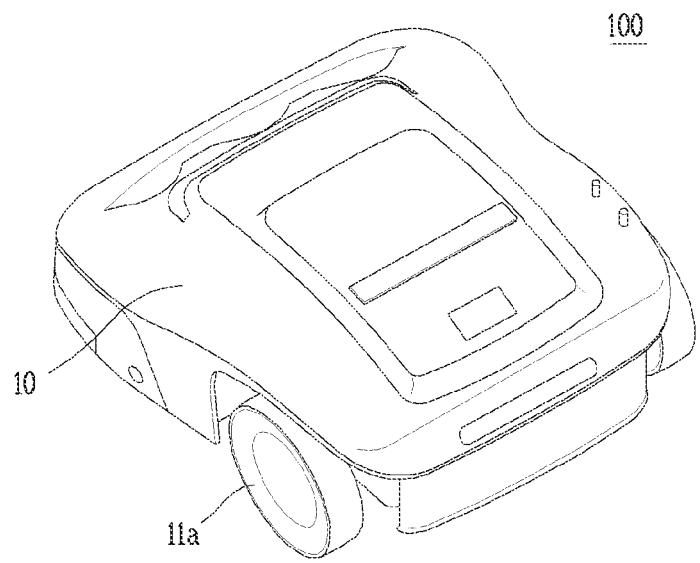
FIG. 1C is a configuration diagram b illustrating a configuration of the moving robot according to the present disclosure.
Figure 1D:
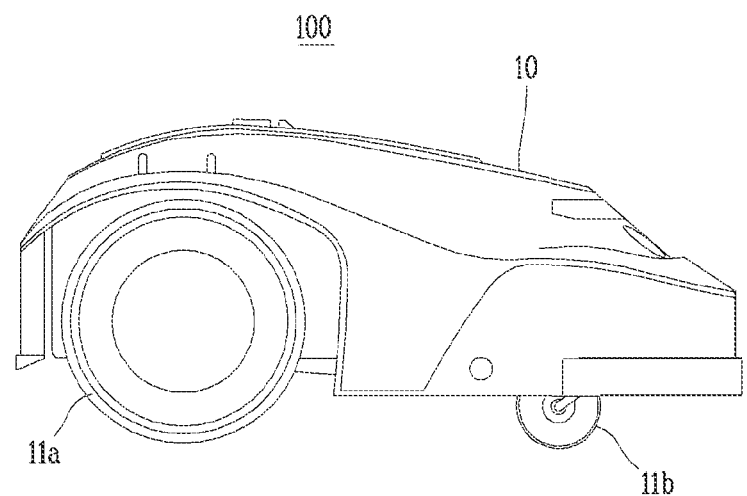
FIG. 1D is a configuration diagram c illustrating a configuration of the moving robot according to the present disclosure.

As shown in FIGS. 1C and 1D, the robot 100 may be an autonomous traveling robot provided to be capable of moving and including the main body 10 that may cut a lawn. The main body 10 forms an outer shape of the robot 100 and includes one or more elements to perform operations such as traveling of the robot 100, cutting a lawn, etc. The main body 10 includes the driving unit 11 that may move the main body 10 in a desired direction and rotate the main body 10. The driving unit 11 may include a plurality of rotatable driving wheels. Each of the driving wheels may individually rotate so that the main body 10 may rotate in a desired direction. In detail, the driving unit 11 may include at least one main driving wheel 11a and an auxiliary wheel 11b. For example, the main body 10 may include two main driving wheels 11a, and the two main driving wheels 11a may be installed on a rear lower surface of the main body 10. The main body 10 may include the receiver 12. The receiver 12 may include a signal sensor module that receives the plurality of transmission signals transmitted from the charging station 500. That is, the receiver 12 may be configured to include a signal sensor module. Accordingly, the signal sensor module may receive the plurality of transmission signals transmitted from the plurality of signal transmission modules 510a and 510b, respectively.

Figure 2:
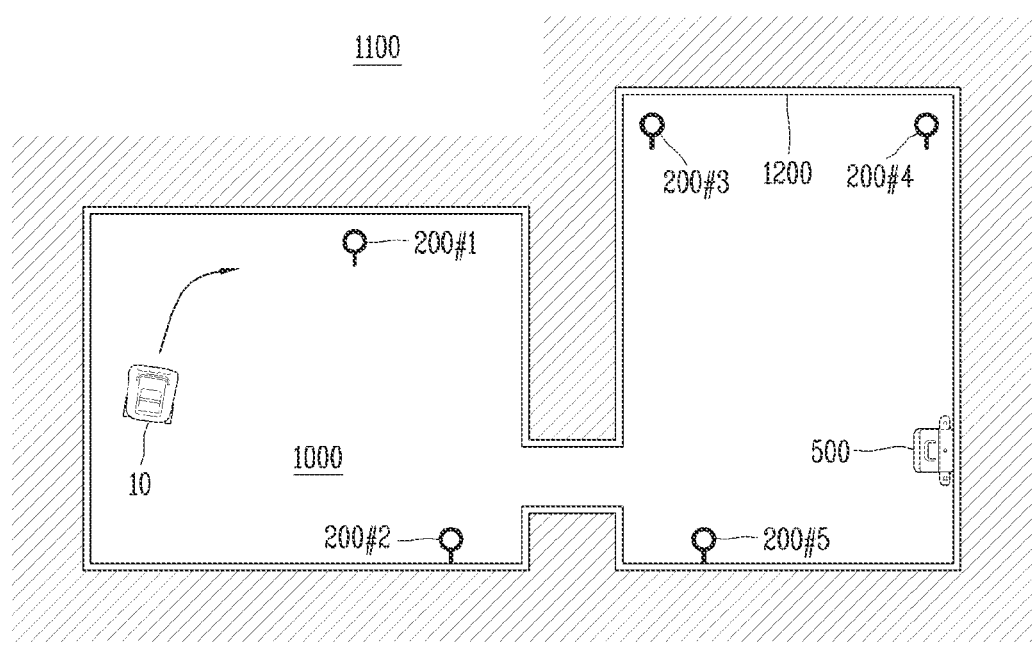
FIG. 2 is a conceptual diagram illustrating an embodiment of a travel area of the moving robot according to the present disclosure.

The robot 100 may travel by itself in the travel area 1000 shown in FIG. 2. The robot 100 may perform a particular operation during traveling. Here, the particular operation may be an operation of cutting a lawn in the travel area 1000. The travel area 1000 is an area corresponding to a target location in which the robot is to travel and operate. A predetermined outside/outdoor area may be formed as the travel area 1000. For example, a garden, a yard, or the like in which the robot 100 is to cut a lawn may be formed as the travel area 1000. The charging station 500 by which driving power of the robot 100 is charged may be installed at one point of the travel area 1000. The robot 100 may be charged by driving power by docking on the charging station 500 installed in the travel area 1000.

The travel area 1000 may be formed as a boundary area 1200 that is, as shown in FIG. 2. The boundary area 1200 corresponds to a boundary line between the travel area 1000 and an outside area 1100 so that the robot 100 travels in the boundary area 1200 and does not deviate to the outside area 1100. In this case, the boundary area 1200 may be formed in a closed curved shape or a closed loop shape. Also, in this case, the boundary area 1200 may be defined by a wire 1200 formed in a closed curve or a closed loop. The wire 1200 may be installed in an arbitrary area. The robot 100 may travel in the travel area 1000 having a closed curved shape formed by the wire 1200 that is installed.

As shown in FIG. 2, a transmitter 200 may be provided in the travel area 1000. At least one transmitter 200 may be provided in the travel area 1000. At least three transmitters 200 may be preferably provided in a distributed manner. The at least one transmitter 200 is a signal generation element that transmits a signal via which the robot 100 determines position information. The at least one transmitter 200 may be provided and installed in the travel area 1000 in a distributed manner. The robot 100 may receive a signal transmitted from the transmitter 200, and determine a current position based on a reception result or determine position information regarding the travel area 1000. In this case, the receiver 12 in the robot 100 may receive the transmitted signal. The transmitter 200 may preferably be arranged in a periphery of the boundary area 1200 of the travel area 1000. In this case, the robot 100 may determine the boundary area 1200 based on a position of the arrangement of the transmitter 200 in the periphery of the boundary area 1200. The transmitter 200 may include an inertial measurement unit (IMU) sensor that detects posture information of the transmitter 200. The IMU sensor is a sensor including at least one selected from a gyro sensor, an acceleration sensor, and an altitude sensor. The IMU sensor may be a sensor that senses posture information of the transmitter 200. Accordingly, the transmitter 200 may sense the posture information according to a present arrangement state via the IMU sensor. Further, when a posture is changed according to a change of a position, the transmitter 200 may sense the change of the posture according to the change of the position via the IMU sensor.

Figure 3A:
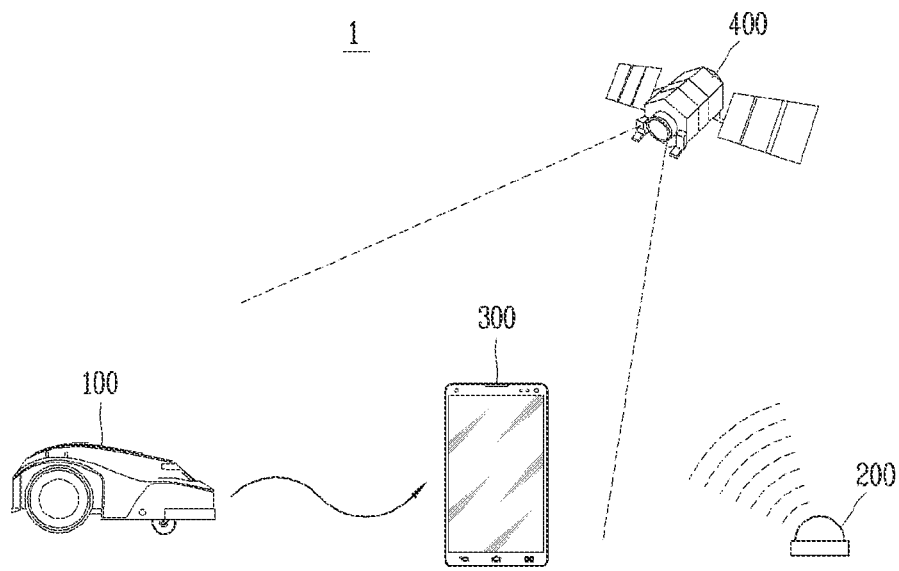
FIG. 3A is a conceptual diagram illustrating a traveling principle of the moving robot and the moving robot system according to the present disclosure.
Figure 3B:
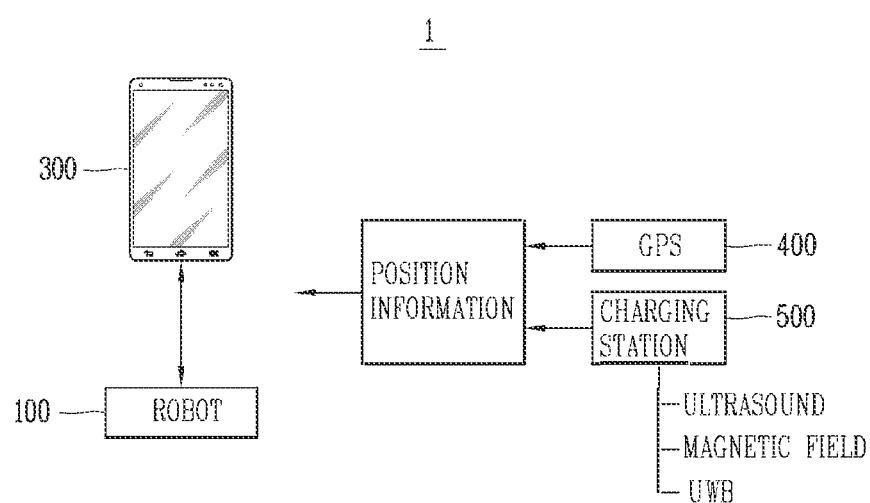
FIG. 3B is a conceptual diagram illustrating a signal flow between devices to determine positions of the moving robot and the moving robot system according to the present disclosure.

The robot 100 that travels in the travel area 1000 and cuts a lawn as shown in FIG. 2 may operate according to a traveling principle shown in FIG. 3A, and a signal may flow between devices to determine a position as shown in FIG. 3B.

As shown in FIG. 3A, the robot 100 may communicate with a terminal 300 moving in a predetermined area, and travel by following a position of the terminal 300 based on data received from the terminal 300. The robot 100 may set a virtual boundary in a predetermined area based on position information received from the terminal 300 or collected while the robots 100 is traveling by following the terminal 300, and set an internal area formed by the virtual boundary as the travel area 1000. When the boundary area 1200 and the travel area 1000 are set, the robot 100 may travel in the travel area 1000 such that the robot 100 does not deviate from the boundary area 1200. According to cases, the terminal 300 may set the boundary area 1200 and transmit the boundary area 1200 to the robot 100. When the terminal 300 changes or expands an area, the terminal 300 may transmit changed information to the robot 100 so that the robot 100 may travel in a new area. Also, the terminal 300 may display data received from the robot 100 on a screen to monitor operation of the robot 100.

The robot 100 or the terminal 300 may determine a current position by receiving position information. The robot 100 and the terminal 300 may determine a current position of the robot 100 based on the plurality of transmission signals transmitted from the charging station 500 or a global positioning system (GPS) signal obtained using a GPS satellite 400. For example, a distance between the robot 100 and the charging station 500 may be measured based on reception strength, a reception direction, reception time, or the like of the plurality of transmission signals. Then, based on the measured distance, a current position of the robot 100 may be determined by determining a position of the charging station 500 in the travel area 100. Alternatively, the GPS satellite 400 may receive a GPS signal transmitted from the GPS module in the charging station 500 and determine a current position of the charging station 500 based on the GPS signal to thereby determine the current position of the robot 100.

In addition, when the transmitter 200 is provided in the travel area 1000, the robot 100 and the terminal 300 may determine a current position based on a signal for position information transmitted from the transmitter 200. Here, when signals are received from a plurality of transmitters 200, positions of the robot 100 and the plurality of transmitters 200 may be determined by comparing results of the reception as to the signals from the plurality of transmitters 200 with each other, respectively. Alternatively, a current position of the robot 100 may be determined by receiving a GPS signal transmitted from the GPS module included in the transmitter 200 and determining a position of the transmitter 200 based on the GPS signal. In addition, positions of the robot 100 and the plurality of transmitters 200 may be accurately determined by determining distances between the plurality of transmitters 200 based on a position of each of the plurality of transmitters 200. The robot 100 and the terminal 300 may preferably determine a current position by receiving signals transmitted from three transmitters 200 and comparing the signals with each other. That is, three or more transmitters 200 may be preferably provided in the travel area 1000.

The robot 100 sets one certain point in the travel area 1000 as a reference position, and then, calculates a position of the robot 100 as a coordinate while the robot 100 is moving. For example, an initial starting position of the robot 100, that is, a position of the charging station 500 may be set as a reference position. Alternatively, a position of one of the plurality of transmitters 200 may be set as a reference position to calculate a coordinate in the travel area 1000. The robot 100 may also set an initial position of the robot 100 as a reference position in each operation, and then, determine a position of the robot 100 while the robot 100 is traveling. With reference to the reference position, the robot 100 may calculate a traveling distance based on the number of rotations and a rotational speed of the driving unit 11, a rotation direction of the main body 10, etc. to thereby determine a current position of the robot 100 in the travel area 1000. Even when the robot 100 determines a position of the robot 100 using the GPS satellite 400, the robot 100 may determine the position of the robot 100 using a certain point as a reference position.

As shown in FIG. 3B, the robot 100 may determine a current position of the robot 100 based on position information transmitted from the GPS satellite 400 or the charging station 500. The position information may be transmitted in the form of a GPS signal, an ultrasound signal, an infrared signal, an electromagnetic signal, or an ultra-wideband (UWB) signal. A transmission signal transmitted from the charging station 500 may preferably be a UWB signal. That is, the transmission signal may be a UWB signal transmitted from a signal transmission module 510 in the charging station 500. Accordingly, the robot 100 may receive the UWB signal transmitted from the charging station 500, and determine a current position of the robot 100 based on the UWB signal. The charging station 500 may also include the GPS module to transmit a GPS signal. In this case, the GPS signal transmitted from the charging station 500 may be received by the GPS satellite 400. In addition, the GPS satellite 400 may transmit to the robot 100 a reception result as to the GPS signal from the charging station 500.

Figure 4:
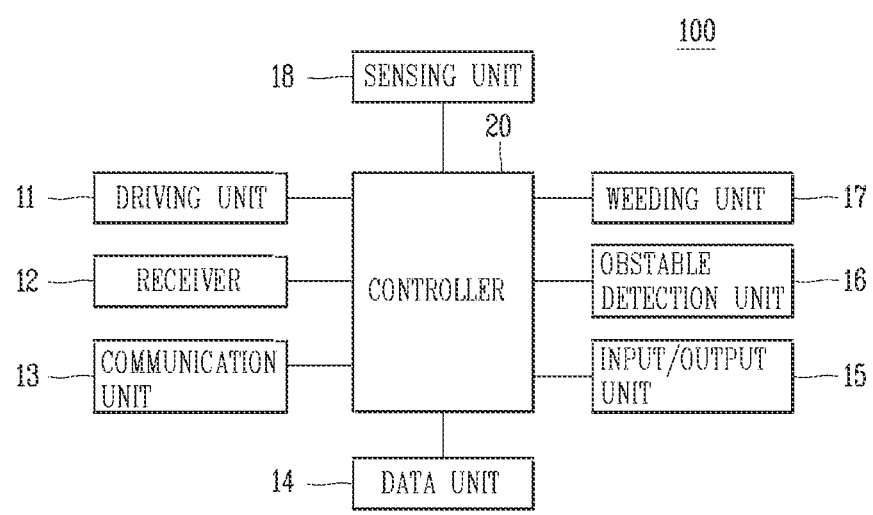
FIG. 4 is a detailed configuration diagram of the moving robot according to the present disclosure.

As shown in FIG. 4, the robot 100 operating as described above may include the main body 10, the driving unit 11, the receiver 12, the sensing unit 13, and the controller 20, and travel in the travel area 1000 based on the reception result obtained by the receiver 12, the sensing result obtained by the sensing unit 12, and the area map. Also, the robot 100 may further include at least one selected from a data unit 14, an input/output unit 15, an obstacle detection unit 16, a weeding unit 17, and a communication unit 18.

The driving unit 11 is a driving wheel included in a lower part of the main body 10, and may be rotationally driven to move the main body 10. That is, the driving unit 11 may drive the main body 10 to travel in the travel area 1000. The driving unit 11 may include at least one driving motor to move the main body 10 so that the robot 100 travels. For example, the driving unit 11 may include a left wheel driving motor for rotating a left wheel and a right wheel drive motor for rotating a right wheel.

The driving unit 11 may transmit information about a result of the driving to the controller 20, and receive a control command for operation from the controller 20. The driving unit 11 may operate according to the control command received from the controller 20. That is, the driving unit 11 may be controlled by the controller 20.

The receiver 12 may include the signal sensor module that transmits and receives the transmission signal. The signal sensor module may be included in a location of in the main body 10 in which the transmission signal may be received, and receive the transmission signal from the charging station 500. The signal sensor module may transmit a signal to the charging station 500. When the charging station 500 transmits a signal using a method of using one selected from an ultrasound signal, a UWB signal, and an infrared signal, the receiver 12 may include a sensor module that transmits and receives an ultrasound signal, a UWB signal, or an infrared signal, in correspondence with this. The receiver 12 may preferably include a UWB sensor. As a reference, UWB radio technology refers to technology using a very wide frequency range of several GHz or more in baseband instead of using a radio frequency (RF) carrier. UWB wireless technology uses very narrow pulses of several nanoseconds or several picoseconds. Since pulses emitted from such a UWB sensor are several nanoseconds or several picoseconds long, the pulses have good penetrability. Thus, even when there are obstacles in a periphery of the receiver 12, the receiver 12 may receive very short pulses emitted by another UWB sensor.

When the robot 100 travels by following the terminal 300, the terminal 300 and the robot 100 each include a UWB sensor, and thus, transmit and receive UWB signals with each other through the UWB sensor. The terminal 300 may transmit the UWB signal to the robot 100 through the UWB sensor included in the terminal 300. The robot 100 may determine a position of the terminal 300 based on the UWB signal received through the UWB sensor, and thus, move by following the terminal 300. In this case, the terminal 300 operates as a transmitting side and the robot 100 operates as a receiving side. When the transmitter 200 includes the UWB sensor and transmits a signal, the robot 100 or the terminal 300 may receive the signal transmitted from the transmitter 200 through the UWB sensor included in the robot 100 or the terminal 300. In this case, a signaling method performed by the transmitter 200 may be identical to or different from that by the robot 100 or the terminal 300.

The receiver 12 may include one or more UWB sensors. That is, the signal sensor module may be a UWB sensor. The receiver 12 may receive a plurality of signals transmitted in a plurality of directions from the main body 10 and compare the plurality of received signals with each other to thereby accurately calculate a position of the robot 100. For example, according to a position of the robot 100, the charging station 500, or the terminal 300, when a measured distance with respect to a signal received from a left side is different from that received from a right side, relative positions of the robot 100, the charging station 500 or the terminal 300 and a direction of the robot 100 may be determined based on the measured distances.

The receiver 12 may transmit a reception result with respect to the transmitted signals to the controller 20, and receive a control command for operation from the controller 20. The receiver 12 may operate according to the control command received from the controller 20. That is, the receiver 12 may be controlled by the controller 20.

The sensing unit 13 may include at least one sensor that senses information about a posture and operation of the main body 10. The sensing unit 13 may include at least one sensor that senses a magnetic field state in a periphery of the main body 10. Here, the at least one sensor may include a magnetic field sensor. That is, the sensing unit 13 may include at least one magnetic field sensor to sense a magnetic field state at a point in which the main body 10 is located. For example, the sensing unit 13 may sense at least one selected from a magnetic field direction and magnetic field strength in a periphery of the main body 10. The sensing unit 13 may further include at least one selected from an inclination sensor that detects movement of the main body 10 and a speed sensor that detects a driving speed of the driving unit 11. The inclination sensor may be a sensor that senses posture information of the main body 10. When the inclination sensor is inclined forward, backward, leftward or rightward against the main body 10, the inclination sensor may sense the posture information of the main body 10 by calculating an inclined direction and an inclination angle. A tilt sensor, an acceleration sensor, or the like may be used as the inclination sensor. In a case of the acceleration sensor, any one selected from a gyro type sensor, an inertial type sensor, and a silicon semiconductor type sensor may be adopted. In addition, various sensors or devices capable of detecting movement of the main body 10 may be used. The sensing unit 13 including such an inclination sensor may sense a magnetic field state through the inclination sensor. The speed sensor may be a sensor that senses a driving speed of a driving wheel in the driving unit 11. When the driving wheel rotates, the speed sensor may sense the driving speed by detecting rotation of the driving wheel.

The sensing unit 13 may transmit information about a result of the sensing to the controller 20, and receive a control command for operation from the controller 20. The sensing unit 13 may operate according to a control command received from the controller 20. That is, the sensing unit 13 may be controlled by the controller 20.

The data unit 14 is a storage element that stores data readable by a microprocessor, and may include a hard disk drive (HDD), a solid state disk (SSD), a silicon disk drive (SDD), a read only memory (ROM) a random access memory (RAM), CD-ROM, a magnetic tape, a floppy disk, or an optical data storage device. In the data unit 14, a received signal may be stored, reference data to determine an obstacle may be stored, and obstacle information regarding a detected obstacle may be stored. In the data unit 14, control data that controls operation of the robot 100, data according to an operation mode of the robot 100, collected position information, and information about the travel area 1000 and a boundary 1200 may be stored.

The input/output unit 15 may include input elements such as at least one button, a switch, a touch pad, or the like, and output elements such as a display unit, a speaker, or the like to receive a user command and output an operation state of the robot 100.

The input/output unit 15 may transmit information about the operation state to the controller 20 and receive a control command for operation from the controller 20. The input/output unit 15 may operate according to a control command received from the controller 20. That is, the input/output unit 15 may be controlled by the controller 20.

The obstacle detection unit 16 includes a plurality of sensors to detect obstacles in a traveling direction. The obstacle detection unit 16 may detect an obstacle located in front of the main body 10, that is, in a traveling direction of the main body 10 using at least one selected from a laser sensor, an ultrasound sensor, an infrared sensor, and a three-dimensional (3D) sensor. The obstacle detection unit 16 may further include a cliff detection sensor installed on a rear surface of the main body 10 to detect a cliff.

In addition, the obstacle detection unit 16 may include a camera for detecting an obstacle by photographing a front. The camera is a digital camera, and may include an image sensor (not shown) and an image processing unit (not shown). An image sensor is a device that converts an optical image into an electrical signal. The image sensor includes a chip in which a plurality of photodiodes are integrated. A pixel may be an example of a photodiode. Charges are accumulated in each of pixels by an image formed on a chip by the light passing through the lens, and the charges accumulated in each of the pixels are converted into an electrical signal (for example, a voltage). A charge-coupled device (CCD) sensor and a complementary metal oxide semiconductor (CMOS) sensor are well known as image sensors. In addition, the camera may include an image processing unit (a digital signal processor (DSP)) for processing a captured image.

The obstacle detection unit 16 may transmit information about a result of the detection to the controller 20, and receive a control command for operation from the controller 20. The obstacle detection unit 16 may operate according to the control command received from the controller 20. That is, the obstacle detection unit 16 may be controlled by the controller 20.

The weeding unit 17 cuts grass on a bottom during traveling. The weeding unit 17 includes a brush or a blade that cuts a lawn, and mow a law on the bottom through rotation.

The weeding unit 17 may transmit information about a result of operation to the controller 20 and receive a control command for the operation from the controller 20. The weeding unit 17 may operate according to a control command received from the controller 20. That is, the weeding unit 17 may be controlled by the controller 20.

The communication unit 18 may communicate with a communication device that is to communicate with the robot 100, using a wireless communication method. For example, the communication unit 13 may communicate with at least one selected from the transmitter 200, the terminal 300, and the GPS satellite 400. The communication unit 18 is connected to a predetermined network and may communicate with an external server or the terminal 300 that controls the robot 100. When the communication unit 18 communicates with the terminal 300, the communication unit 18 may transmit a generated map to the terminal 300, receive a command from the terminal 300, and transmit data regarding an operation state of the robot 100 to the terminal 300. The communication unit 18 may include a communication module such as a wireless fidelity (Wi-Fi) module, a wireless broadband (WiBro) module, or the like, as well as a short-range wireless communication module such as Zigbee, Bluetooth, or the like, to transmit and receive data. The communication unit 18 may communicate with the GPS satellite 400 via the terminal 300 that communicates with the GPS satellite 400. In addition. the communication unit 18 may further include a GPS module that transmits and receives a GPS signal to/from the GPS satellite 400 to communicate with the GPS satellite 400. When the communication unit 18 communicates with the GPS satellite 400, the GPS satellite 400 may receive GPS signals transmitted from at least one transmitter 200 provided in the travel area 1000 or the charging station 500, and transmit a result of the reception as to the GPS signals to the communication unit 18. That is, when the communication unit 18 communicates with the GPS satellite 400 that receives a GPS signal from the transmitter 200 or the charging station 500, the communication unit 18 may receive from the GPS satellite 400 a result of the reception as to the GPS signal.

The communication unit 18 may transmit information about a result of the communication to the controller 20, and receive a control command for operation from the controller 20. The communication unit 18 may operate according to the control command received from the controller 20. That is, the communication unit 18 can be controlled by the controller 20.

The controller 20 may include a central processing unit to control all operations of the robot 100. The controller 20 may determine position information in the travel area 1000 via the receiver 12 and the sensing unit 13 to thereby control the main body 10 to travel in the travel area 1000 via the driving unit 11. The controller 20 may also control the robot 100 to perform functions/operations via the data unit 14, the input/output unit 15, the obstacle detection unit 16, the weeding unit 17, and the communication unit 18.

The controller 20 may control input/output of data and control the driving unit 11 so that the main body 10 travels according to settings. The controller 20 may independently control operations of the left wheel driving motor and the right wheel driving motor by controlling the driving unit 11 to thereby control the main body 10 to travel rotationally or in a straight line.

The controller 20 may set the boundary area 1200 of the travel area 1000 based on position information received from the terminal 300 or position information determined based on the transmitted signal received from the charging station 500. The controller 20 may also set the boundary area 1200 of the travel area 1000 based on position information that is collected by the controller 20 during traveling. The controller 20 can set a certain area of a region formed by the set boundary area 1200 as the travel area 1000. The controller 20 may set the boundary area 1200 in a closed loop form by connecting discontinuous position information using a line or a curve, and set an inner area within the boundary area 1200 as the travel area 1000. When the travel area 1000 and the boundary area 1200 corresponding thereto are set, the controller 20 may control traveling of the main body 10 so that the main body 10 travels in the travel area 1000 and does not deviate from the set boundary area 1200. The controller 20 may determine a current position based on received position information and control the driving unit 11 so that the determined current position is located in the travel area 1000 to thereby control traveling of the main body 10.

In addition, according to obstacle information input by the obstacle detection unit 16, the controller 20 may control traveling of the main body 10 to avoid obstacles. In this case, the controller 20 may reflect the obstacle information in pre-stored area information regarding the travel area 1000 to thereby modify the travel area 1000.

The robot 100 having a configuration shown in FIG. 4 may travel in the travel area 1000, as the controller 10 determines a current position of the main body 10 based on at least one selected from a reception result obtained by the receiver 12, a sensing result obtained by the sensing unit 18, a communication result obtained by the communication unit 18, and the area map that is pre-stored, and controls the driving unit 11 so that the main body 10 travels in the travel area 1000.

While the robot 100 travels in the travel area 1000 shown in FIG. 1A, the robot 100 may perform set operations. For example, while the robot 100 is traveling in the travel area 1000, the robot 100 may cut a lawn on a bottom of the travel area 1000.

In the robot 100, the main body 10 may travel as the driving unit 11 is driven. The main body 10 may travel as the driving unit 11 is driven to move the main body 10.

In the robot 100, the driving unit 11 may move the main body 10 by driving wheels. The driving unit 11 may move the main body 10 by driving the driving wheels so that the main body 10 may perform traveling.

In the robot 100, the receiver 12 may receive the plurality of transmission signals transmitted from the charging station 500 provided in the travel area 1000, while the robot 100 is traveling. The charging station 500 may include the plurality of signal transmission modules 510a and 510b, and transmit the plurality of transmission signals via the plurality of signal transmission modules 510a and 510b. The receiver 12 may include the signal sensor module that receives the plurality of transmission signals to thereby receive the plurality of transmission signals. While the main body 10 is traveling in the travel area 1000, the receiver 12 may receive the plurality of transmission signals in real time. That is, the charging station 500 may transmit the plurality of transmission signals in real time, and the receiver 12 may receive the plurality of transmission signals in real time during traveling. Thus, the receiver 12 may receive the plurality of transmission signals each time when a position of the main body 10 is changed according to the traveling. Here, the plurality of transmission signals transmitted from the plurality of signal transmission modules 510a and 510b may be transmitted in a constant form. In addition, as the plurality of transmission signals are transmitted from a position in which the charging station 500 is provided, that is, from a fixed position of the charging station 500, a reception sensitivity of the plurality of transmission signals may vary depending on a position of the main body 10. That is, a reception result obtained by receiving the plurality of transmission signals may vary depending on a position in which the plurality of transmission signals are received, that is, a position of the main body 10. The robot 100 may determine a current position of the main body 10 based on the plurality of transmission signals, of which reception result varies depending on positions in which the plurality of transmission signals are received. For example, when the main body 10 travels from one point to another point, distances are measured between the charging station 500 and the main body 10 at the one point and the another point, respectively, based on the reception result obtained while the main body 10 travels from the one point to the another point, and it is determined that the main body 10 moved from the one point to the another point based on the measured distances. Thus, a current position of the main body 10 may be determined. In addition, as the signal sensor module receives the plurality of transmission signals transmitted from different positions, respective reception results obtained by receiving the plurality of transmission signals are different. Thus, a current position of the main body 10 may be determined by comparing the reception results obtained by receiving the plurality of transmission signals with each other.

In the robot 100, the sensing unit 13 may sense a magnetic field state at a position in which the main body 10 is located during traveling. The sensing unit 13 may sense a magnetic field state at a current position. The sensing unit 13 may sense at least one selected from a magnetic field direction and magnetic field strength at a point in which the main body 10 is located during traveling. The sensing unit 13 may include at least one magnetic field sensor that senses at least one selected from a magnetic field direction and magnetic field strength at a point in which the main body 10 is located. Thus, the sensing unit 13 may sense the magnetic field state at a current position during traveling. The sensing unit 13 may sense the magnetic field state in real time during traveling. Accordingly, the sensing unit 13 may sense the magnetic field state at each point in a path of the travel area 1000 via which the main body 10 travels.

The controller 20 in the robot 100 may determine a position of the main body 10 based on at least one selected from the reception result obtained by the receiver 12, the sensing result obtained by the sensing unit 13, and the area map, and control the driving unit 11 so that the main body 10 travels in the travel area 1000, to thereby control traveling of the main body 10. Here, the area map is a map of the travel area 1000, and an arrangement position of the charging station 500 and the boundary area 1200 may be designated on the area map. The area map may be pre-stored in the robot 100. For example, the area map may be pre-stored in the data unit 14. The area map may be pre-generated according to at least one selected from a previous traveling history of the robot 100, a position of the charging station 500, and a user setting of the robot 100, and pre-stored in the robot 100. The controller 20 may determine a position of the charging station 500 and measure a distance between the main body 10 and the charging station 500 based on the reception result, and determine a current position of the main body 10 based on the measured distance. The controller 20 may determine a magnetic field state information at a current position of the main body 10 based on the sensing result. Thus, a particular point in the travel area 1000 may be searched/identified. For example, if the main body 10 is located at an x point, magnetic field state information at the x point may be determined and stored based on the sensing result at the x point, and the stored magnetic field state information is compared with a sensing result at a current position to thereby search/identify whether the current position corresponds to the x point. Accordingly, based on the sensing result, a position of the travel area 100 may be determined or position information of the travel area 100 may be converted into a coordinate. In addition, the controller 20 may further measure a distance for which the main body 10 has traveled, based on at least one selected from a sensing result obtained by the sensing unit 13 and a communication result obtained by the communication unit 18, and determine a current position of the main body 10 based on the measured distance. The controller 20 may control driving of the driving unit 11 so that the main body 10 travels in the travel area 1000 according to the determined current position. That is, according to the determined current position, the controller 20 may control traveling of the main body 10 by controlling driving of the main body 10 so that the main body 10 does not deviate from the boundary area 1200. The controller 20 may also control operation of the main body 10 so that the main body 10 performs set operation.

Figure 5A:
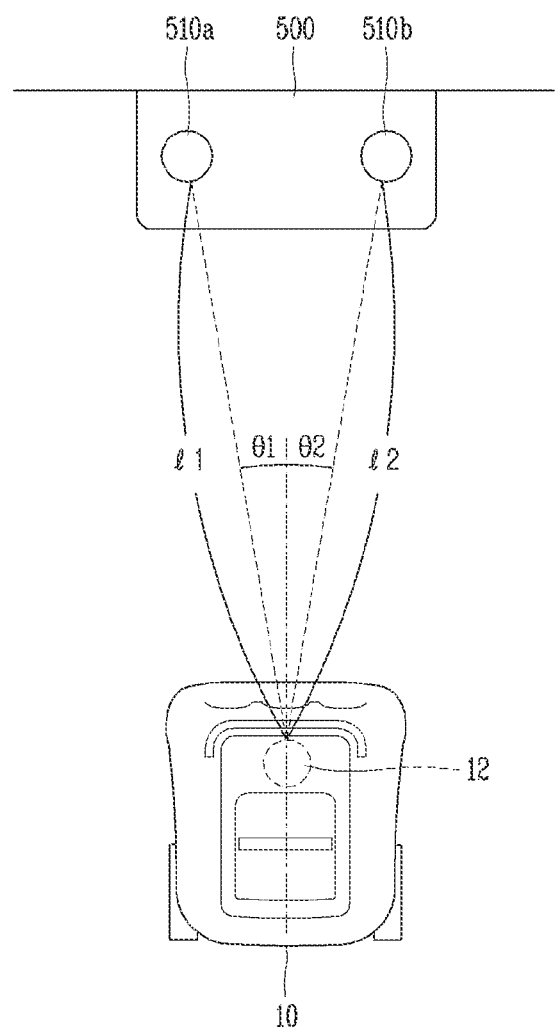
FIG. 5A is an exemplary view a for explaining an example of receiving a transmission signal according to an embodiment of the moving robot and the moving robot system according to the present disclosure.
Figure 5B:
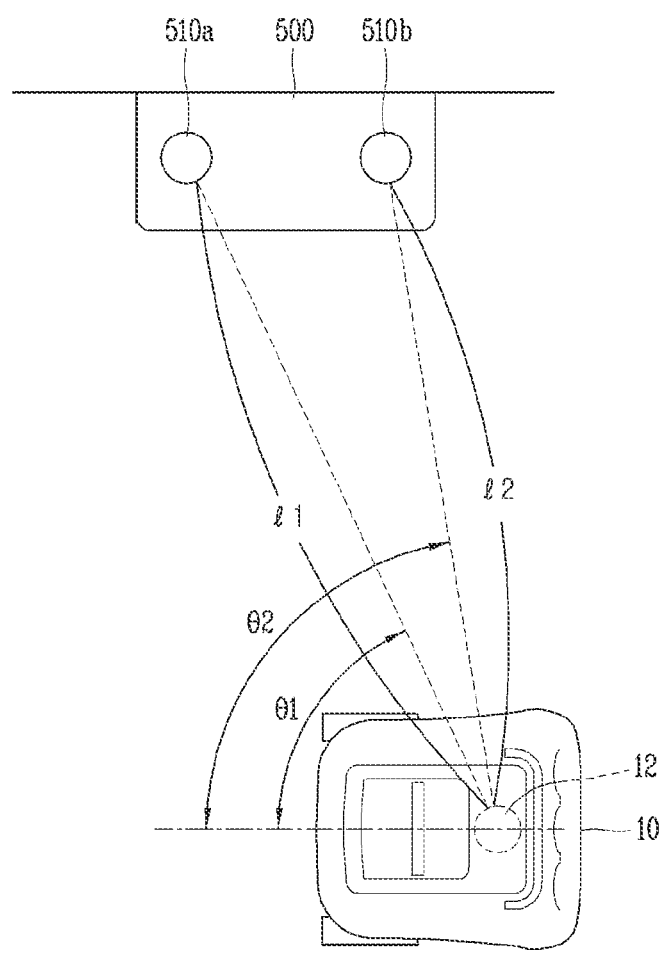
FIG. 5B is an exemplary view b for explaining an example of receiving a transmission signal according to an embodiment of the moving robot and the moving robot system according to the present disclosure.
Figure 5C:
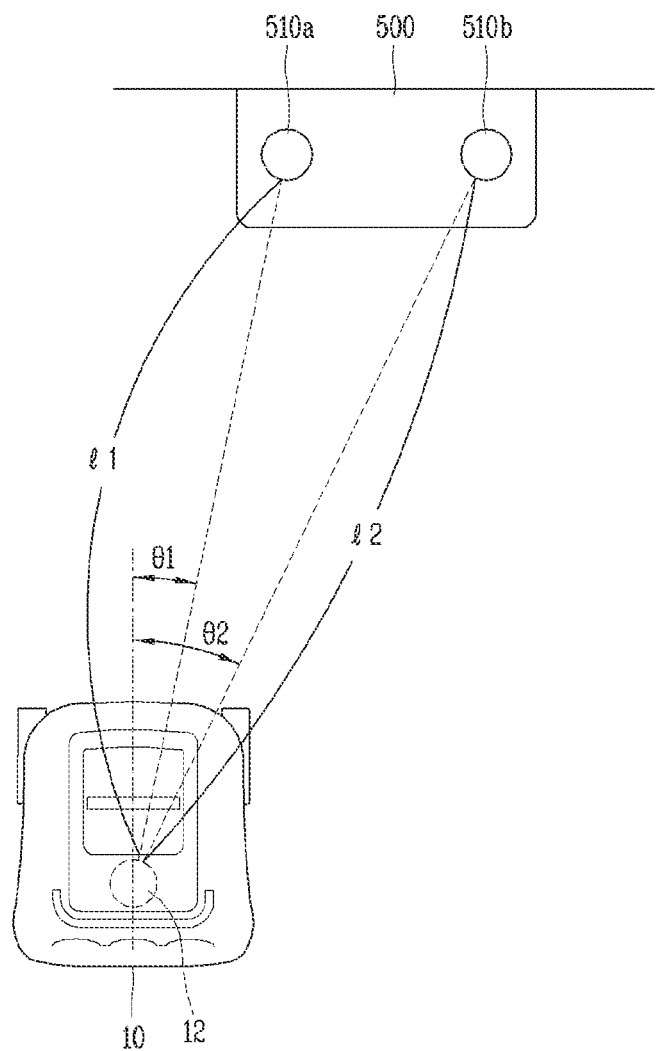
FIG. 5C is an exemplary view c for explaining an example of receiving a transmission signal according to an embodiment of the moving robot and the moving robot system according to the present disclosure.

The robot 100 including the driving unit 11, the receiver 12, the sensing unit 13 and the controller 20 may be configured such that the receiver 12 includes one or more signal sensor modules to transmit and receive a plurality of transmission signals with the plurality of signal transmission modules 510a and 510b included in the charging station 500. That is, in a mode of practice of the robot 100, the charging station 500 may include the plurality of signal transmission modules 510a and 510b to transmit the plurality of transmission signals via the plurality of signal transmission modules 510a and 510b, and the receiver 12 may receive the plurality of transmission signals transmitted from the plurality of signal transmission modules 510a and 510b, respectively. Accordingly, the robot 100 may receive the plurality of transmission signals transmitted from the plurality of signal transmission modules 510a and 510b, and thus, sense strength and a transmission direction (a reception angle) of the plurality of the transmission signals. That is, the controller 20 may control traveling of the main body 10 to move to the charging station 500, by determining a direction in which the charging station 500 is located based on a result of the sensing as to the strength and the transmission direction of the plurality of the transmission signals. For example, as shown in FIG. 5A, the first signal transmission module 510a and the second signal transmission module 510b are provided on left and right sides of the charging station 500, and thus, the first signal transmission module 510a and the second signal transmission module 510b transmit the plurality of transmission signals at different positions, respectively, and the receiver 12 receives the first transmission signal and the second transmission signal transmitted from the first signal transmission module 510a and the second transmission signal module 510a, respectively. Thus, results of receiving the first transmission signals and the second transmission signals may be with each other to thereby determine a position from which the transmission signal is transmitted, that is, a direction in which the charging station 500 is located, and thus, control the main body 10 to return to the charging station 500. In detail, in such a case that the first transmission signal transmitted from the first signal transmission module 510a provided on the left side of the charging station 500 is received from [a distance (strength) of I1 at an angle of θ1] and the second transmission signal transmitted from the second transmission module 510b provided on the right side of the first transmission module 500a is received from [a distance of I2 at an angle of θ2], when reception results as to the first and second transmission signals are compared with each other, a direction in which the first and second transmission signals are transmitted may be determined. Thus, traveling of the main body 10 may be controlled in the determined direction in which the charged charging station 500 is located to thereby return the main body to the charging station 500. Particularly, as shown in FIGS. 5B and 5C, when the reception result as to the first transmission signal is different from the reception result as to the second transmission signal as the main body 10 is not positioned in a straight line with the charging station 500, a direction in which the charging station 500 is located may be determined by comparing those different results with each other. That is, as the robot 100 receives the plurality of transmission signals from the plurality of signal transmission modules 510a and 510b, the robot 100 may receive the plurality of transmission signals in all directions from the main body 10. Thus, the robot 100 may determine a position of the charging station 500 regardless of a state of a traveling direction of the main body, and thus, the main body 10 may move to the charging station 500.

As such, the controller 20 that controls traveling of the main body 10 controls the main body 10 to depart from the charging station 500, travel in the travel area 1000, and then, move to the charging station 500. That is, the controller 20 may control the driving unit 11 so that the main body 10 departs from the charging station 500, travels in the travel area 1000, and then, returns to the charging station 500.

Figure 6A:
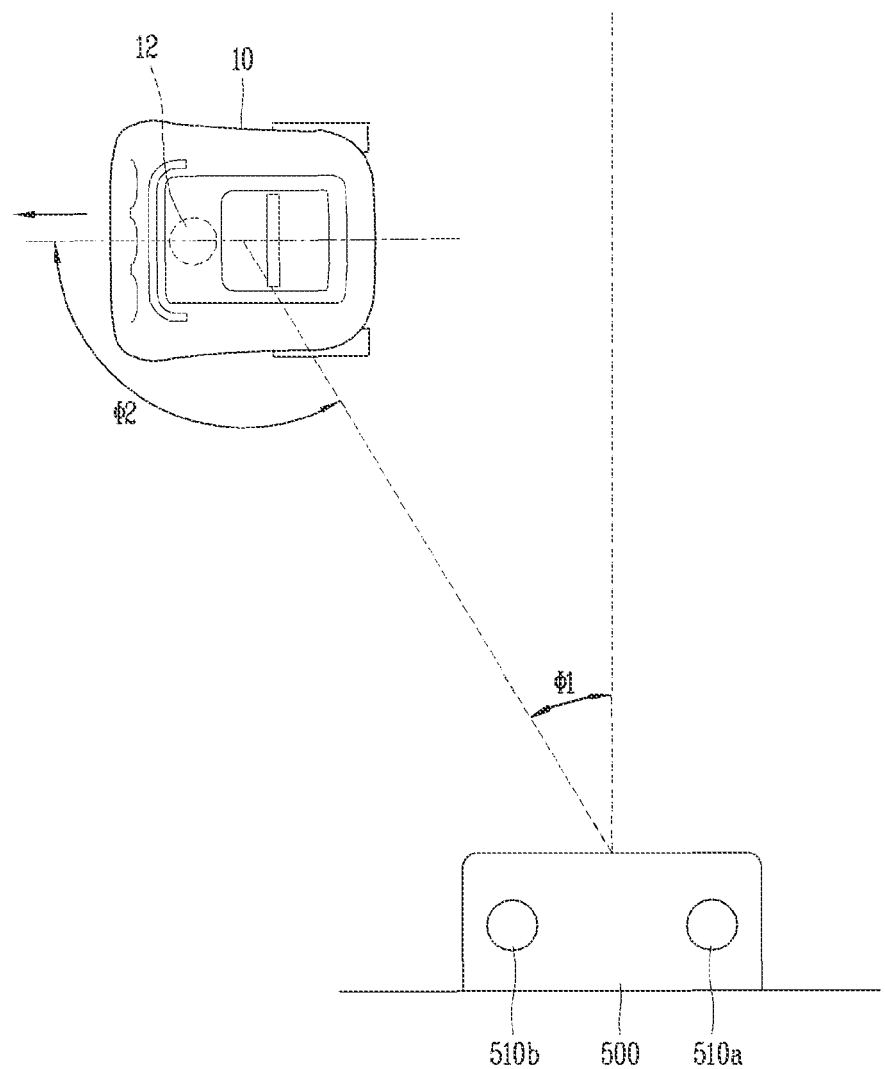
FIG. 6A is an exemplary view a illustrating an example of moving to a charging station according to an embodiment of the moving robot and the moving robot system according to the present disclosure.
Figure 6B:
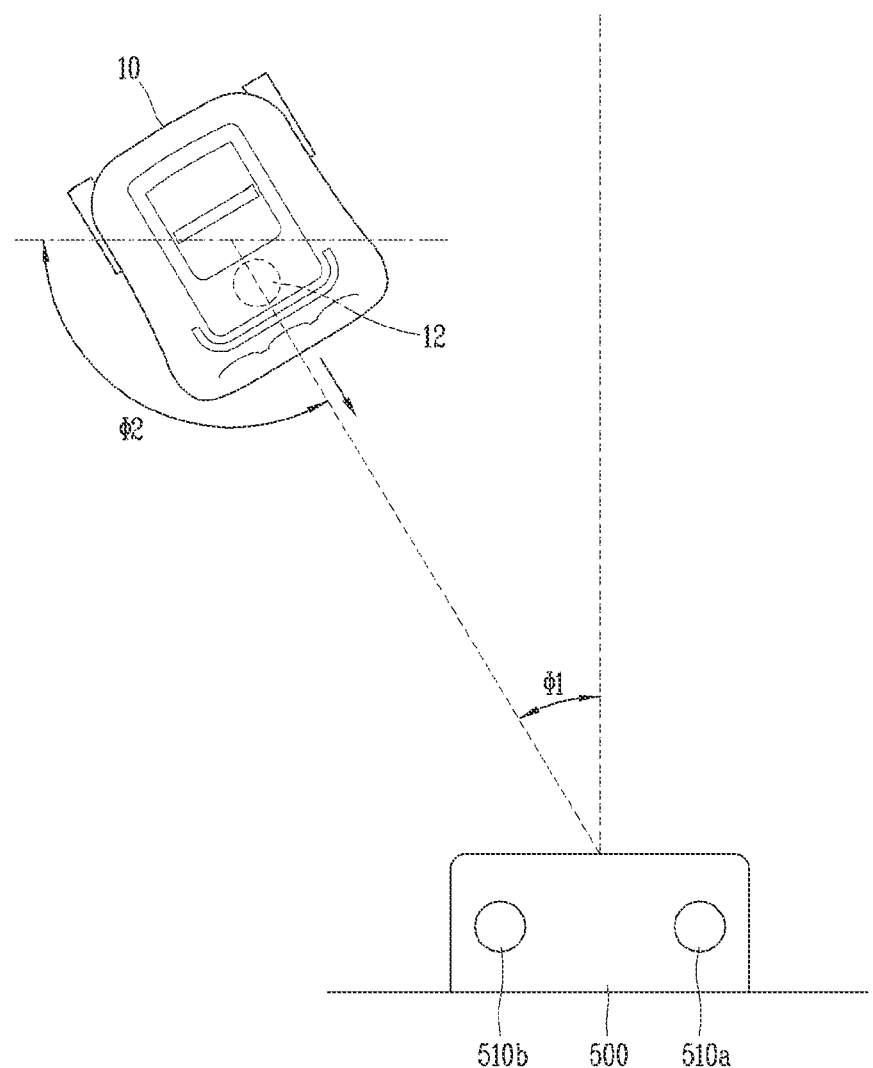
FIG. 6B is an exemplary view b illustrating an example of moving to the charging station according to an embodiment of the moving robot and the moving robot system according to the present disclosure.

When the controller 20 that controls the main body 10 to depart from the charging station 500 and return to the charging station 500 controls the main body 10 to move to the charging station 500, the controller 20 determines a direction in which the charging station 500 is located based on the reception result obtained by receiving the plurality of transmission signals at a current position, and determines a traveling direction of the main body 10 based on the sensing result as to the magnetic field state at the current position. Thus, the controller 20 switches the traveling direction of the main body 10 to the direction in which the charging station 500 is located, and controls the main body 10 to move to the charging station 500. That is, the controller 20 determines the direction in which the charging station 500 is located based on the reception result, determines the traveling direction based on the sensing result, and control the main body 10 to move to the charging station 500 by switching the determined traveling direction to the direction in which the charging station 500 is located. As such, as shown in FIGS. 6A and 6B, the robot 100 that moves to the charging station 500 based on a result of the determination according to the reception result and the sensing result may determine the direction in which the charging station 500 is located and switch the traveling direction.

The controller 20 may compare respective results of receiving the plurality of transmission signals at the current position with each other, and determine the direction in which the charging station 500 is located according to a result of the comparison. For example, as shown in FIG. 6A, based on a result of the reception as to each of the plurality of transmission signals at the current position, the controller 20 may determine a current position of the main body 10 and a position of the charging station 500 according to the current position of the main body 10, and thus, determine the direction in which the charging station 500 is located with respect to the current position of the main body 10. In this case, the controller 20 may determine a position angle φ1 of the charging station 500 with respect to the main body 10 based on a reception angle according to the reception result with reference to one arbitrary straight line, and thus, determine a direction angle φ1 at which the charging station 500 is located with respect to the current position of the main body 10.

The controller 20 may analyze a magnetic field direction at the current position from the sensing result at the current position, and thus, determine a traveling direction of the main body 10 according to a result of the analysis. For example, as shown in FIG. 6A, based on a result of sensing the magnetic field state at the current position, the robot 100 may analyze a magnetic field direction at the current position, and determine a direction in which the main body 10 is traveling with reference to the magnetic field direction to thereby determine the traveling direction ←. In this case, according to a result of determining the direction φ1 in which the charging station 500 is located and the traveling direction ←, the controller 20 may determine an angle difference (φ2=φ1+90°) between the traveling direction ← and the direction φ1 in which the charging station 500 is located.

According to a result of the determination as to the direction in which the charging station 500 is located and the traveling direction, the controller 20 may control the main body 10 to move to the charging station 500 by switching the traveling direction to the direction in which the charging station 500 is located. For example, as shown in FIG. 6B, the controller 20 may switch the traveling direction to the direction in which the charging station 500 is located so that the traveling direction is directed toward the charging station 500, and thus, control the main body 10 to move to the charging station 500 when the traveling direction is directed toward the charging station 500. In this case, the controller 20 may control the main body 10 to move to the charging station 500 by determining the angle difference φ2 between the traveling direction ← and the direction φ1 in which the charging station 500 is located and switching the traveling direction to the direction in which the charging station 500 is located in correspondence with the determined angle difference φ2 between the traveling direction ← and the direction φ1 in which the charging station 500 is located.

As such, as shown in FIGS. 6A and 6B, as the robot 100 switches the traveling direction to the direction in which the charging station 500 is located based on the reception result and the sensing result, and thus, moves the charging station 500 to thereby return to the charging station 500.

As such, the controller 20 that controls the main body 10 to move to the charging station 500 may control the main body 10 to move from the current position to a docking point based on docking information pre-stored with respect to the docking point, and then, move from the docking point to the charging station 500. That is, when the robot 100 is to return to the charging station 500, the robot 100 may move from the current position to the docking point based on the pre-stored docking information, move to the charging station 500 via the docking point, and then, dock on the charging station 500. Here, the docking point may be one location via which the robot 100 is to dock on the charging station 500, and position information may be stored in the docking information. The docking point is a transit point via which the robot 100 is to move to the charging station 500. The docking point may be a reference point for movement and docking of the robot 100 when the robot 100 is to move to the charging station 500 after the robot 100 travels in the travel area 1000.

The controller 20 may store information at one point to which the robot 100 departs from the charging station 500 and moves for a predetermined distance as the docking information. That is, the docking point is one point to which the robot 100 moved from the charging station 500 by the predetermined distance, and may be a point that is spaced apart from the charging station 500 for the predetermined distance. The controller 20 may store information about the reception result and the sensing result at the point in the docking information. The controller 20 may store, in the docking information, information regarding the reception result obtained by the receiver 12 as to the transmission signal and the sensing result obtained by the sensing unit 13 as to the magnetic field state, both at the docking point. Accordingly, in the docking information, position information of the docking point and the information regarding the reception result and the sensing result at the docking point may be stored. Based on the position information of the docking point and the information regarding the reception result and the sensing result at the docking point, both stored in the docking information, the controller 20 may control the main body 10 to move to the docking point. The controller 20 may determine the traveling direction at the docking point and the direction in which the charging station 500 is located, based on the information stored in the docking information, and control the main body 10 to move to the docking point based on a result of the determination. The robot 100 that moves to the charging station 500 via the docking point may move to the charging station 500 via the docking point in a sequence shown in FIGS. 7A through 7E.

Figure 7A:
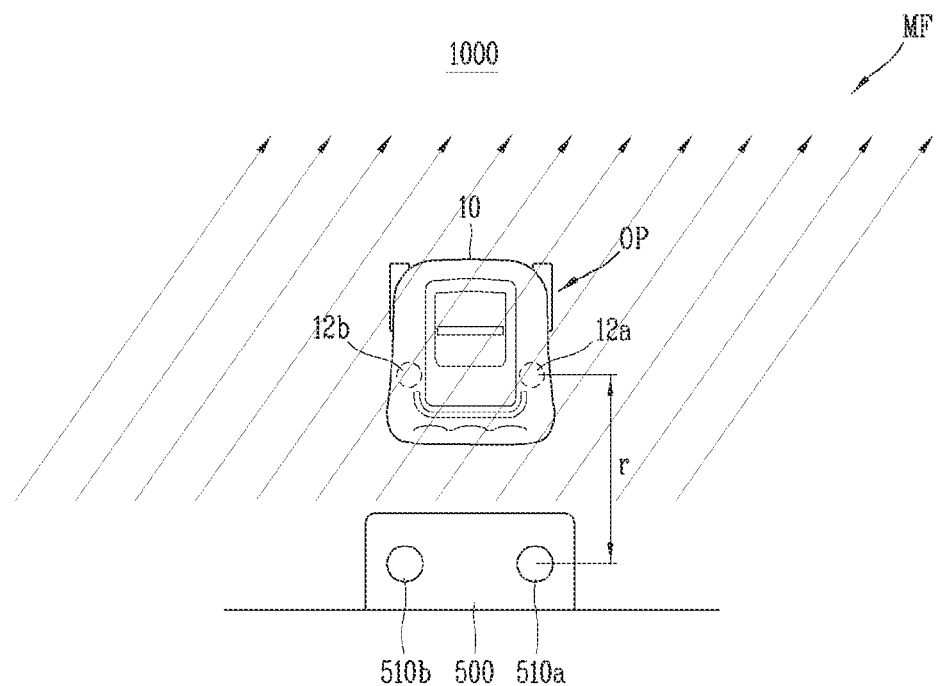
FIG. 7A is an exemplary view a illustrating an example of a moving process according to an embodiment of the moving robot and the moving robot system according to the present disclosure.

As shown in FIG. 7A, when the main body 10 departs from the charging station 500, the controller 20 may control the main body 10 to move backward from the charging station 500 for a predetermined r, and thus, be located at one point OP to be directed toward the charging station 500. When the main body 10 departs from the charging station 500, the controller 20 may control the main body 10 to move backward for the predetermined distance r when the main body 10 is docking on the charging station 500, that is, when a traveling direction of the main body 10 is directed toward the charging station 500, and thus, be located at the one point OP spaced apart from the charging station 500 by the predetermined distance r. After the main body 10 is located at the one point OP, the sensing unit 13 may sense the magnetic field state. That is, the magnetic field state at the one point OP may be sensed.

The controller 20 may analyze a direction of a magnetic field MF according to the traveling direction of the main body 10 from a result of the sensing at the one point OP. That is, the controller 20 may analyze the direction of the magnetic field MF when the main body 10 departs backwards from the charging station 500 and the traveling direction of the main body 10 is directed toward the charging station 500. After the controller 20 analyzes the sensing result, the controller 20 may set the one point OP as the docking point and store the sensing result and a result of the analysis as to the sensing result in the docking information. Based on the analysis result, the controller 20 may generate and store coordinate information regarding the one point OP set as the docking point, that is, the docking point OP. For example, the coordinate information of the docking point OP may be set to (0, y). Alternatively, the coordinate information of the docking point OP including a magnetic field state of the docking point OP or a direction of the magnetic field MF at the docking point OP may be generated and stored. Thus, after the main body 10 travels in the travel area 1000, the main body 10 may return to the docking point OP based on the docking information. For example, the sensing result obtained when the main body moves to the docking point OP is compared with the analysis result. Then, the analysis result, that is, a point that matches a direction of the magnetic field MF at the docking point OP is checked. Thus, the main body 10 may return to the docking point OP. Thereafter, the controller 20 may control the traveling of the main body 10 so that the main body 10 travels in the travel area 1000. That is, as shown in FIG. 7A, the controller 20 may depart from the charging station 500 and analyze the sensing result at the docking point OP. Then, the controller 20 may store information obtained at the docking point OP in the docking information, and then, control the main body 10 to travel in the travel area 1000.

Figure 7B:
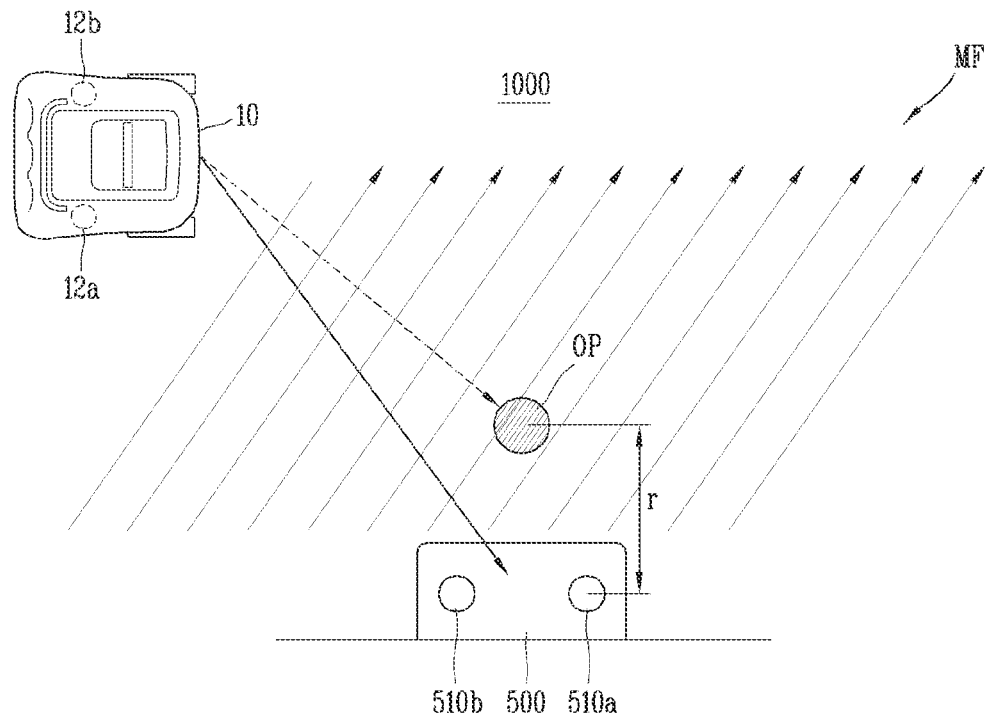
FIG. 7B is an exemplary view b illustrating an example of a moving process according to an embodiment of the moving robot and the moving robot system according to the present disclosure.

While the main body 10 is traveling in the travel area 1000, the controller 20 may check a direction in which a reception angle of the transmission signal corresponds to predetermined criteria based on the reception result obtained at the current position. Then, the controller 20 may determine the checked direction as the direction in which the charging station 500 is located. For example, as shown in FIG. 7B, a direction in which a difference between reception angles of the first transmission signal and the second transmission signal at the current position is less than predetermined criteria may be determined as the direction in which the charging station 500 is located. The controller 20 may also determine the traveling direction at the current position based on the sensing result at the current position. For example, as shown in FIG. 7B, when the main body 10 is traveling in a left direction from the travel area 1000, the left direction from the travel region 1000 may be determined as the traveling direction based on the sensing result.

Figure 7C:
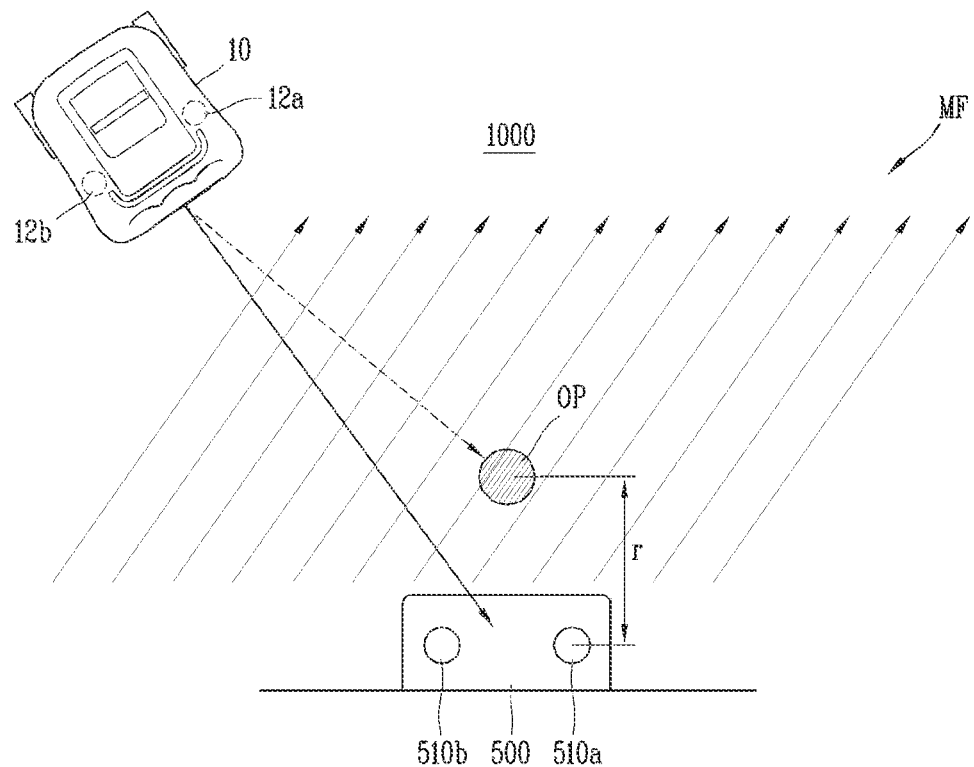
FIG. 7C is an exemplary view c illustrating an example of a moving process according to an embodiment of the moving robot and the moving robot system according to the present disclosure.
Figure 7D:
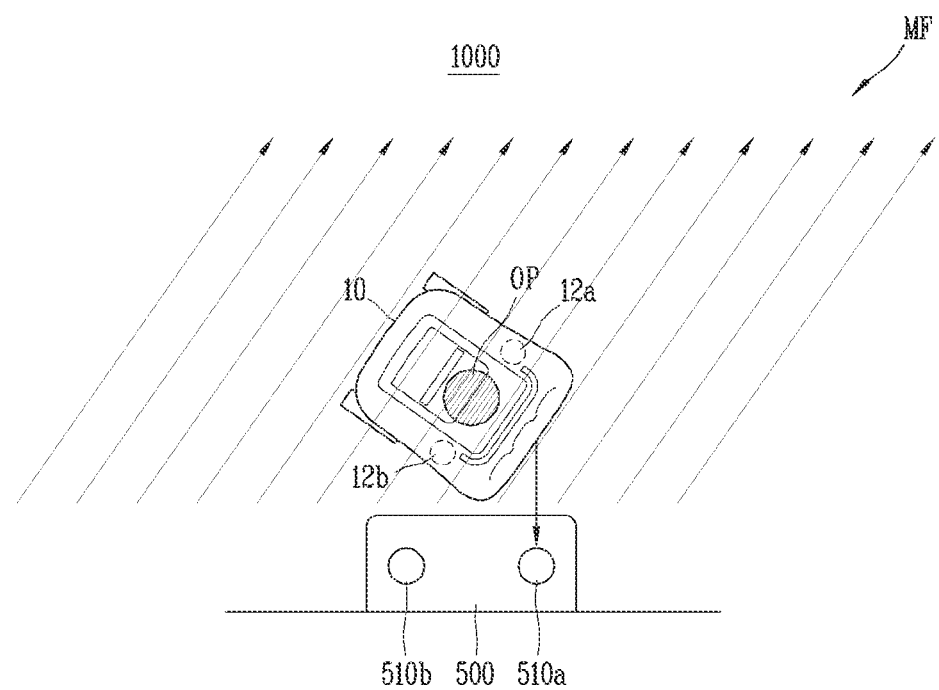
FIG. 7D is an exemplary view d illustrating an example of a moving process according to an embodiment of the moving robot and the moving robot system according to the present disclosure.

When the controller 20 controls the main body 10 to move to the charging station 500, the controller 20 may determine a traveling direction of the main body 10 and a direction in which the docking point OP is located based on the docking information, and switch the traveling direction of the main body 10 to the direction in which the docking point OP is located so that the main body moves to the docking point OP. In this case, as shown in FIG. 7C, the controller 20 may determine a direction in which the charging station 500 is located and the traveling direction based on the reception result and the sensing result at the current position, and determine a direction in which the docking point OP is located based on the docking information. Then, based on a result of the determination as to the traveling direction and the direction in which the docking point OP is located, the controller 20 may switch the traveling direction of the main body 10 to the direction in which the docking point OP is located, and control the main body 10 to move to the docking point OP. That is, when the main body 10 travels in the travel area 1000, and then, moves to the charging station 500, the controller 20 may switch the traveling direction to the direction in which the docking point OP is located based on the reception result, the sensing result, and the docking information at the current position as shown in FIG. 7C. Then, when the traveling direction is switched to the direction in which the docking point OP is located, the controller 20 may control the main body 10 to move to the docking point OP so that the main body 10 is located at the docking point OP as shown in FIG. 7D. When the controller 20 controls the main body 10 to move to the docking point OP, the controller 20 may compare the sensing result with the analysis result stored in the docking information while the main body 10 is moving to the docking point OP, and then, control the main body 10 to be located at the docking point OP according to a result of the comparison. In this case, while the main body 10 is moving to the docking point OP, the controller 20 may check a point at which the sensing result corresponds to the analysis result, that is, a point at which the sensing result matches a direction of the magnetic field MF at the docking point OP, and then, control the main body 10 to move to the docking point OP. For example, while the main body 10 is moving to the docking point OP, the controller 20 may compare the sensing result with the analysis result, and control the main body 10 to move to a point at which the sensing result matches the analysis result, that is, a point corresponding to a direction of the magnetic field MF at the docking point based on the comparison. Thus, as shown in FIG. 7D, the main body 10 may be located at the docking point OP.

Figure 7E:
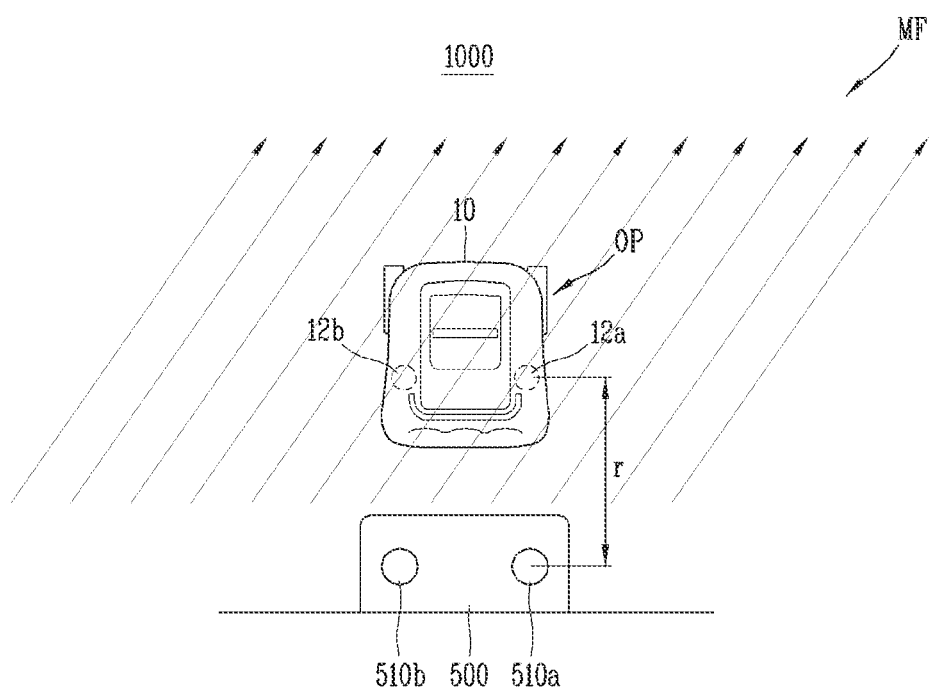
FIG. 7E is an exemplary view e illustrating an example of a moving process according to an embodiment of the moving robot and the moving robot system according to the present disclosure.

When the controller 20 controls the main body 10 to move from the docking point OP to the charging station 500, the controller 20 may determine the traveling direction and the direction in which the charging station 500 is located based on the docking information, switch the traveling direction to the direction in which the charging station 500 is located, and thus, control the main body 10 to move to the charging station 500. That is, in such as case that the controller 20 controls the main body 10 to move to the charging station 500 when the main body is located at the docking point OP as shown in FIG. 7D, the controller 20 may determine the traveling direction at the docking point OP and a direction in which the charging station 500 is located based on the docking information. Then, the controller 500 may switch the traveling direction to the direction in which the charging station 500 is located as shown in FIG. 7E, and thus, control the main body 10 to move to the charging station 500. Accordingly, as the traveling direction of the main body 10 is directed toward a front of the charging station 500, the main body 10 may dock on the front of the charging station 500. In this case, the controller 20 may control the main body 10 to move for the predetermined distance r for which the main body 10 moved after the main body 10 departed from the charging station 500.

As such, as the controller 20 controls traveling of the main body 10 based on the reception result obtained by the receiver 12 and the sensing result obtained by the sensing unit 13, the main body 10 may depart from the charging station 500, and then, return to the charging station 500 via the docking point OP as shown in a process shown in FIGS. 7A to 7E.

Figure 8:
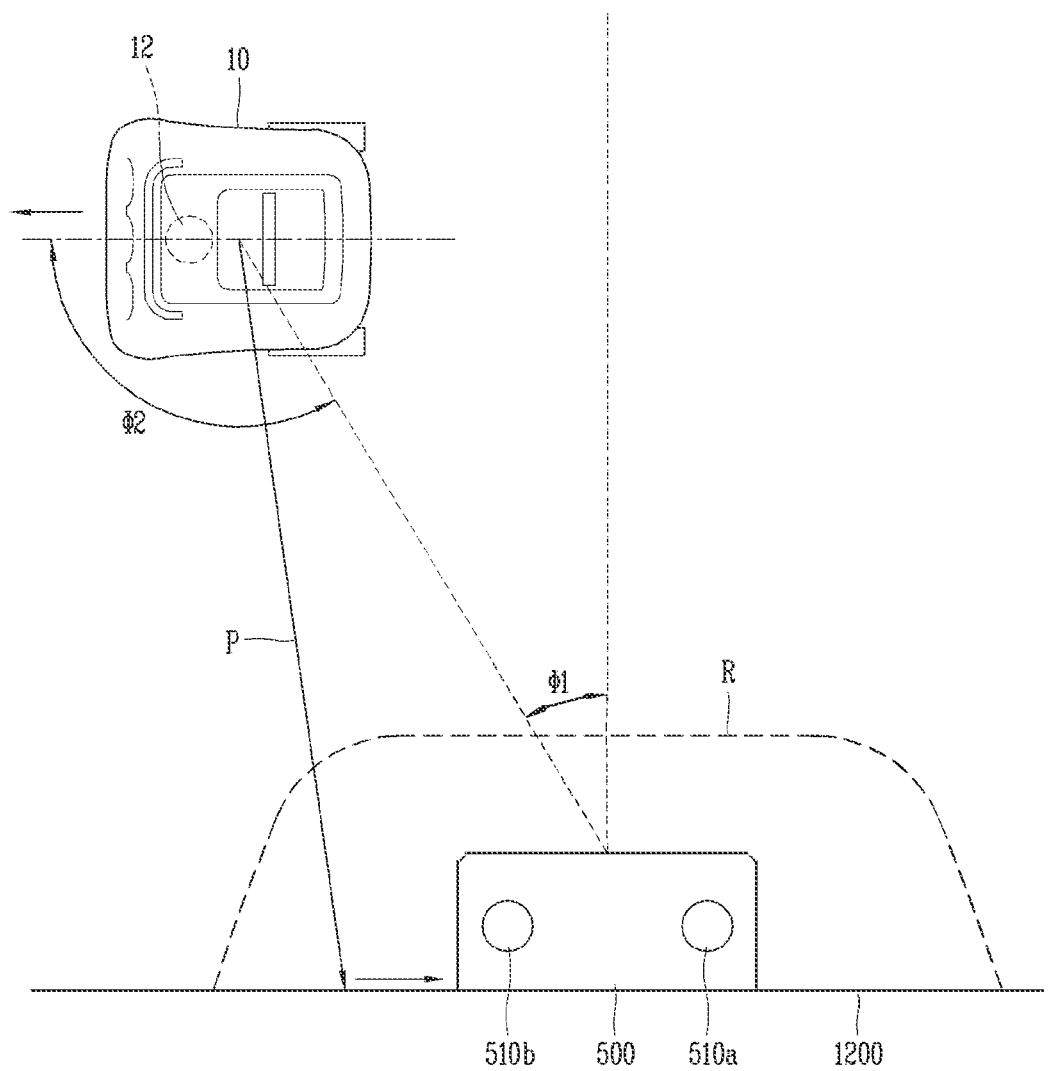
FIG. 8 is an exemplary view illustrating a further example of movement to the charging station according to an embodiment of the moving robot and the moving robot system according to the present disclosure.

As such, the controller 20 that controls the main body 10 to move to the charging station 500 by switching the traveling direction based on the reception result and the sensing result may control the main body 10 to move into a predetermined range with reference to the charging station 500. For example, as shown in FIG. 8, the controller may control movement of the main body 10 so that a target movement point P of the main body 10 corresponds to a predetermined range R with reference to the charging station 500. That is, when the controller 20 controls the main body 10 to move to the charging station 500, the controller 20 may control the main body 10 to move to the charging station 500 by applying a predetermined offset to the target movement point P so that the target movement point P of the main body 10 corresponds to the predetermined range R with reference to the charging station 500. Accordingly, when the robot 100 is to move to the charging station 500, the robot 100 may move to a position corresponding to the predetermined range R with reference to the charging station 500. As such, the controller 20 that controls the movement of the main body 10 so that the target movement point P of the main body 10 corresponds to the predetermined range R may control the main body 10 to move to a position corresponding to the predetermined range R, and then, move from the position corresponding to the predetermined range R to the charging station 500 along the boundary area 1200 of the travel area 1000. After the main body 10 is located at the position corresponding to the predetermined range R, the controller 20 may detect the boundary area within the predetermined area R, and control the main body 10 to move to the charging station 500 along the boundary area 1200. For example, the controller 20 may detect the wire 1200 installed in, and thus, forming the boundary area 1200, and then, control the main body 10 to move along the wire 1200 and dock on the charging station 500. That is, the controller 20 may apply a predetermined offset to the target movement point P to control the main body 10 to move into the predetermined range R, and then, move to the charging station 500.

The above-described embodiments of the robot 100 may be applied to a moving robot system and a method for moving to a charging station of the moving robot to be described below. In addition, embodiments of the moving robot system and a method for moving to a charging station of the moving robot may be also applied to the robot 100.

Hereinafter, a moving robot system 1 (hereinafter referred to as a system) according to the present disclosure will be described.

As shown in FIG. 1A, the system 1 is a system including the robot 100 and the charging station 500, wherein the robot 100 cuts a lawn in the travel area 1000 and the charging station 500 communicates with the robot 100 and the robot 100 is charged by driving power in the charging system 500. The system 1 may be applied to all systems including the charging station 500 and the robot 100. Here, the robot 100 may be the robot 100 described above. That is, the system 1 may be a traveling/control/operation system of a lawn mower robot that cuts a lawn in the travel area 1000.

The system 1 includes the charging station 500 that is provided in the travel area 1000 and transmits a plurality of transmission signals for determining position information, and the robot 100 that travels in the travel area 1000 based on at least one selected from a reception result of receiving the plurality of transmission signals, a sensing result of sensing a magnetic field state, and an area map that is pre-stored. Here, the plurality of transmission signals may be UWB signals of which reception result varies depending on a receiving position. That is, in the system 1, the charging station 500 and the robot 100 may transmit and receive the plurality of transmission signals that are the UWB signals.

In the system 1, at least one charging station 500 may be provided in the travel area 1000. The charging station 500 may charge driving power in the robot 100. The charging station 500 may be a station where the robot 100 waits for traveling. Accordingly, before the robot 10 starts traveling or after the robot 100 finishes traveling, the robot 100 may dock on the charging station 500 to wait for traveling and be charged by the driving power.

The charging station 500 may communicate with the robot 100 via the plurality of transmission signals. The charging station 500 may include the plurality of signal transmission modules 510a and 510b and transmit the plurality of transmission signals to the robot 100 via the plurality of signal transmission modules 510a and 510b. The plurality of signal transmission modules 510a and 510b may transmit the plurality of transmission signals, respectively. That is, the charging station 500 may transmit a plurality of transmission signals. In a mode of practice of the system 1 according to the present disclosure, the charging station 500 includes the plurality of signal transmission modules 510a and 510b, and transmit the plurality of transmission signals to the robot 100 via the plurality of signal transmission modules 510a and 510b. The charging station 500 may transmit the plurality of transmission signals to the robot 100 while the robot 100 is traveling. While the robot 100 is traveling in the travel area 1000, the charging station 500 may transmit the plurality of transmission signals to the robot 100 in real time. That is, the charging station 500 may transmit the plurality of transmission signals to the robot 100 in real time. As the robot 100 receives the plurality of transmission signals in real time during traveling, the robot 100 may receive the plurality of transmission signals each time when a position of the robot 100 is changed according to the traveling. Here, the plurality of transmission signals may be transmitted in a predetermined form.

In the system 1, the robot 100 may operate based on driving power charged in the charging station 500 provided in the travel area 1000, and thus, travel in the travel area 1000 and cut a lawn. As shown in FIG. 1B, the robot 100 may include the main body 10, the driving unit 11 that moves the main body 10, the receiver 12 that receives the plurality of transmission signals transmitted from the charging station 500 in the travel area 1000, the sensing unit 13 that senses a magnetic field state at a position in which the main body 10 is located, and the controller 20 that controls traveling of the main body 10 by controlling the driving unit 11 to travel in the travel area 1000 based on at least one selected from a reception result obtained by the receiver 12, a sensing result obtained by the sensing unit 13, and an area map that is pre-stored. That is, as the controller 20 controls the driving unit 11 to travel in the travel area 1000 based on at least one selected from the reception result obtained by the receiver 12, the sensing result obtained by the sensing unit 13, and the area map, the robot 100 may travel in the travel area 1000.

The robot 100 may communicate with the charging station 500 using the plurality of transmission signals. The robot 100 may include one or more signal sensor modules to receive the plurality of transmission signals. In a mode of practice of the system 1 according to the present disclosure, the robot 100 includes a single signal sensor module and may receive the plurality of transmission signals transmitted from the plurality of signal transmission modules 510a and 510b via the signal sensor module. The robot 100 may receive the plurality of transmission signals from the charging station 500 while the robot 100 is traveling. While the robot 10 is traveling in the travel area 1000, the robot 10 may receive the plurality of transmission signals in real time. That is, the charging station 500 may transmit the plurality of transmission signals to the robot 100 in real time. As the robot 100 receives the plurality of transmission signals in real time during traveling, the robot 100 may receive the plurality of transmission signals each time when a position of the robot 100 is changed according to the traveling. Here, as the plurality of transmission signals are transmitted from a position in which the charging station 500 is provided, that is, from a fixed position of the charging station 500, a reception sensitivity of the plurality of transmission signals may be changed according to a position of the robot 100. That is, a result of receiving the plurality of transmission signals may vary depending on a position in which the plurality of transmission signals are received, that is, a position of the robot 100. The robot 100 may determine a current position based on the plurality of transmission signals of which reception result as the plurality of transmission signals varies depending on positions in which the plurality of transmission signals are received. For example, when the robot 100 travels from one point to another point, a current position of the main body 10 may be determined by measuring distances between the charging station 500 and the robot 100 at the one point and the another point, respectively, based on a reception result as to the plurality of transmission signals while the robot 100 travels from the one point to the another point, and then, determining that the robot 100 moved from the one point to the another point based on the measured distances.

Figure 9:
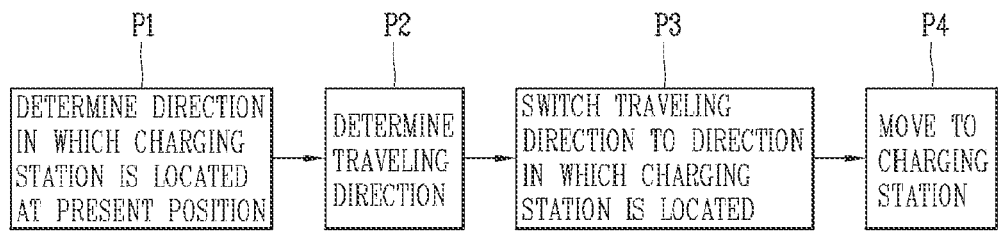
FIG. 9 is a block diagram illustrating a moving process of the moving robot according to an embodiment of the moving robot system according to the present disclosure.
Figure 10:
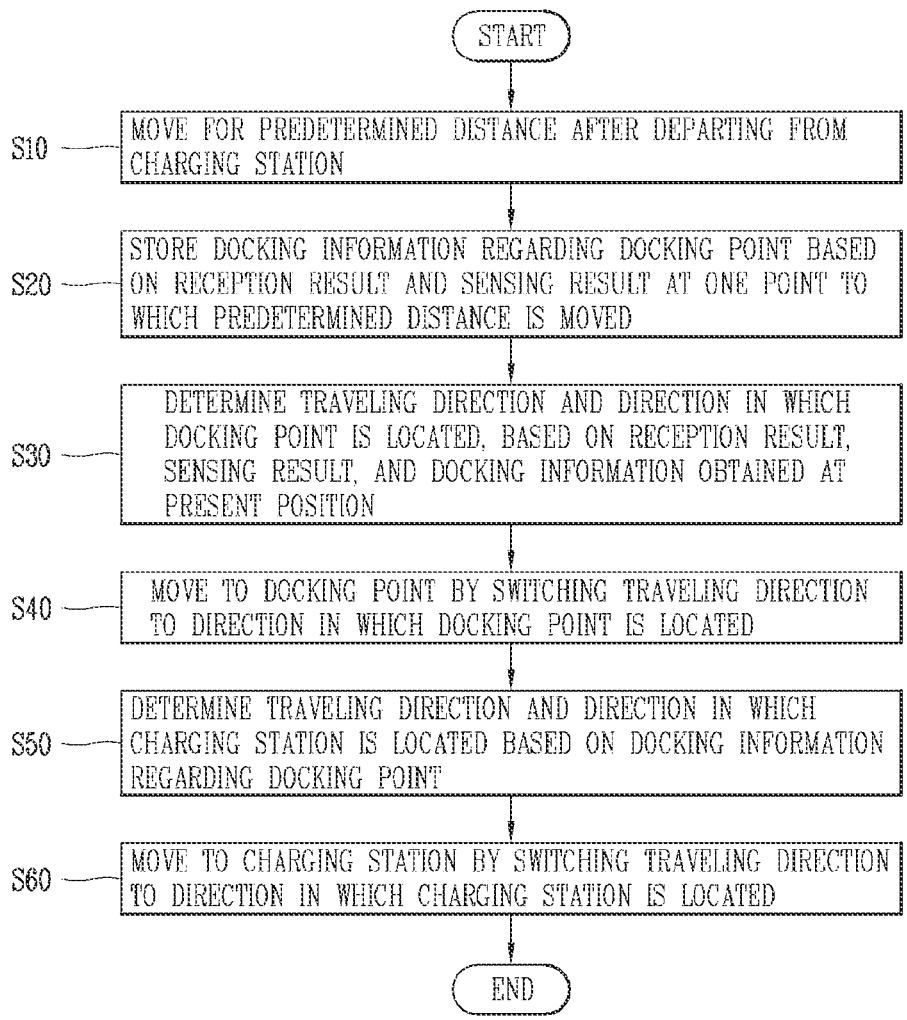
FIG. 10 is a flowchart illustrating a sequence of a method for moving to a charging station of the moving robot according to the present disclosure.

As shown in FIG. 9, in the system 1, the robot 100 determines a direction in which the charging station 500 is located based on the receiving result at a current position (P1), determines a traveling direction of the robot 100 based on the sensing result at the current position (P2), and thus, moves to the charging station 500 according to a result of the determination as to the direction in which the charging station 500 is located and the traveling direction of the robot 100 (P3 and P4). That is, in the system 1, when the robot 100 moves to the charging station 500 after traveling in the travel area 1000, the robot 100 may determine a direction in which the charging station 500 is located and the traveling direction, based on the reception result and the sensing result at the current position, and thus, return to the charging station 500.

The charging station 500 may include the plurality of signal transmission modules 510a and 510b, and each of the plurality of signal transmission modules 510a and 510b may transmit the plurality of transmission signals. The robot 100 may include one signal sensor module, and receive the plurality of transmission signals via the one signal sensor module. Accordingly, as shown in FIGS. 5A to 5C, as the robot 100 receives first and second transmission signals transmitted from the plurality of first and second signal transmission modules 510a and 510b, respectively, the robot 100 may sense strength and a reception angle of the plurality of the transmission signals. That is, the robot 100 may move to the charging station 500 based on the sensing result as to the strength and the reception angle of the plurality of transmission signals received while the robot 100 is traveling in the travel area 1000.

A process in which the robot 100 returns to the charging station 500 in a process shown in FIG. 9 may be performed in a sequence shown in FIGS. 6A and 6B.

When the robot 100 moves to the charging station 500, the robot 100 determines a direction in which the charging station 500 is located based on the reception result as to the plurality of transmission signals at the current position (P1), determines the traveling direction of the robot 100 based on the sensing result as to the magnetic field state at the current position (P2), then, switches the traveling direction to the direction in which the charging station 500 is located (P3), and thus, move to the charging station 500.

The robot 100 may compare reception results as to the plurality of transmission signals at the current position with each other, and determine the direction in which the charging station 500 is located according to a result of the comparison (P1). For example, as shown in FIG. 6A, based on the reception results as to the plurality of transmission signals at the current position, respectively, the controller 20 may determine the current position of the robot 100 and a position of the charging station 500 according to the current position of the main body 10, and thus, determine the direction in which the charging station 500 is located with respect to the current position of the main body 10 (P1). In this case, the controller 100 may determine a position angle φ1 of the charging station 500 with respect to the main body 10 based on the reception angle of the reception result with reference to an arbitrary straight line, and thus, determine a direction angle φ1 at which the charging station 500 is located with respect to the current position of the main body (P1).

The controller 100 may analyze a magnetic field direction at the current position from the sensing result at the current position, and thus, determine the traveling direction of the robot 100 according to a result of the analysis (P2). For example, as shown in FIG. 6A, based on the sensing result as to the magnetic field state at the current position, the robot 100 may analyze the magnetic field direction at the current position, determines a direction in which the robot 100 is traveling with reference to the magnetic field direction, and thus, determine the traveling direction ←(P2). In this case, according to a result of the determination as to the direction angle φ1 at which the charging station 500 is located and the traveling direction ←, the robot 100 may determine the angle difference (φ2=φ1+90°) between the traveling direction ← and the direction φ1 in which the charging station 500 is located (P2).

The robot 100 may switch the traveling direction to the direction in which the charging station 500 is located (P3), according to a result of the determination as to the direction in which the charging station 500 is located and the traveling direction, and may move to the charging station 500 (P4). For example, as shown in FIG. 6B, the robot 100 may switch the traveling direction to the direction in which the charging station 500 is located so that the traveling direction is directed toward the charging station 500 (P3), and thus, move to the charging station 500 when the robot 100 is directed toward the charging station 50 (P4). In this case, the robot 100 may determine the angle difference φ2 between the traveling direction ← and the direction angle φ1 at which the charging station 500 is located, switch the traveling direction to the direction in which the charging station 500 is located in correspondence with the angle difference φ2 between the traveling direction ← and the direction angle φ1 at which the charging station 500 is located (P3), and then, move to the charging station 500 (P4).

As such, when the robot 100 is to move to the charging station 500, the robot 100 may move from the current position to the docking point based on docking information pre-stored with respect to the docking point, and then, move from the docking point to the charging station 500. The robot 100 may store information, regarding one point as the docking information, wherein the robot 100 departs from the charging station 500 and moves to the one point for a predetermined distance. That is, the docking point is one point to which the robot 100 moved from the charging station 500 by the predetermined distance, and may be a point that is spaced apart from the charging station 500 for the predetermined distance. The robot 100 may store, in the docking information, information regarding the reception result and the sensing result at the one point. The robot 100 may store, in the docking information, information regarding a reception result obtained by the receiver 12 as to the plurality of transmission signals and a sensing result obtained by the sensing unit 13 as to the magnetic field state, both at the docking point. Accordingly, in the docking information, position information of the docking point and the information regarding the reception result and the sensing result at the docking point may be stored. The robot 100 may move to the docking point based on position information of the docking point and information regarding the reception result and the sensing result at the docking point, each stored in the docking information. The robot 100 may determine the traveling direction at the docking point and the direction in which the charging station 500 is located, based on the information stored in the docking information, and move to the docking point based on a result of the determination. The robot 100 that moves to the charging station 500 via the docking point may move to the charging station 500 via the docking point in the sequence shown in FIGS. 7A through 7E.

When the robot 100 departs from the charging station 500, the robot 100 may move backward from the charging station 500 for a predetermined distance r as shown in FIG. 7A, and be located at the one point OP to be directed toward the charging station 500. In such a case that the robot 100 is to depart from the charging station 500, the robot 100 may move backward for the predetermined distance r when the robot 100 dock on the charging station 500, that is, a traveling direction of the robot 100 is directed toward the charging station 500, and be located at the one point OP spaced apart from the charging station 500 for the predetermined distance r. After the robot 100 is positioned at the one point OP, the robot 100 may sense the magnetic field state. That is, the magnetic field state at the one point OP can be sensed.

The robot 100 may analyze a direction of the magnetic field MF according to the traveling direction from the sensing result at the one point OP. That is, the robot 100 may analyze the direction of the magnetic field MF when the robot 100 departs backwards from the charging station 500 and the traveling direction of the robot 100 is directed toward the charging station 500. After the robot 100 analyzes the sensing result, the robot 20 may set the one point OP as the docking point and store the sensing result and an analysis result, in which the analysis result is analyzed, in the docking information. In addition, based on the analysis result, the robot 100 may generate and store coordinate information regarding the one point OP set as the docking point, that is, the docking point OP. Thereafter, the robot 100 may travel in the travel area 1000. That is, as shown in FIG. 7A, the robot 100 may depart from the charging station 500 and analyze the sensing result at the docking point OP, store information obtained at the docking point OP in the docking information, and then, travel in the travel area 1000.

While the robot 10 is traveling in the travel area 1000, the robot 10 may check a direction in which a reception angle of the plurality of transmission signals corresponds to predetermined criteria based on the reception result at the current position. Then, the controller 20 may determine the checked direction as a direction in which the charging station 500 is located. For example, as shown in FIG. 7B, a direction in which a difference between reception angles of the first transmission signal and the second transmission signal at the current position is less than predetermined criteria may be determined as the direction in which the charging station 500 is located. The robot 10 may also determine the traveling direction at the current position based on the sensing result at the current position. For example, as shown in FIG. 7B, when the main body 10 is traveling in a left direction from the travel area 1000, the left direction from the travel region 1000 may be determined as the traveling direction based on the sensing result.

When the robot 10 moves to the charging station 500, the robot 100 may determine the traveling direction and the direction in which the docking point OP is located, based on the docking information, and switch the traveling direction to the direction in which the docking point OP is located, and thus, move to the docking point OP. In this case, as shown in FIG. 7C, the robot 100 may determine the direction in which the charging station 500 is located and the traveling direction based on the reception result and the sensing result at the current position, and determine the direction in which the docking point OP is located based on the docking information. Then, based on the result of the determination as to the traveling direction and the result of the determination as to the direction in which the docking point OP is located, the robot 100 may switch the traveling direction to the direction in which the docking point OP is located, and thus, move to the docking point OP. That is, when the robot 100 is to travel in the travel area 1000, and then, move to the charging station 500, the robot 100 may switch the traveling direction to the direction in which the docking point OP is located based on the reception result, the sensing result and the docking information as shown in FIG. 7C. Then, when the traveling direction is switched to the direction in which the docking point OP is located, the robot 100 may move to the docking point OP, and thus, be located at the docking point OP as shown in FIG. 7D. When the robot 100 is to move to the docking point OP, the robot 100 may compare the sensing result with the analysis result stored in the docking information while the main body 10 is moving to the docking point OP, and then, move to be located at the docking point OP according to a result of the comparison. In this case, while the robot 100 is moving to the docking point OP, the robot 100 may check a point at which the sensing result corresponds to the analysis result, that is, a point that matches the direction of the magnetic field MS at the docking point OP, and then, move to the docking point OP. For example, while the robot 100 is moving to the docking point OP, the robot 100 moves to a point at which the sensing result matches the analysis result, that is, a point that matches the direction of the magnetic field MF at the docking point OP, based on comparison between the sensing result and the analysis result. Thus, as shown in FIG. 7D, the robot 100 may be located at the docking point OP.

When the robot 100 moves from the docking point OP to the charging station 500, the robot 100 may determine the traveling direction and the direction in which the charging station 500 is located based on the docking information and switch the traveling direction to the direction in which the charging station 500 is located. Thus, the robot 100 may move to the charging station 500. That is, as shown in FIG. 7D, in such a case that the robot 100 moves to the charging station 500 when the robot is located at the docking point OP, the robot 100 may determine the traveling direction at the docking point OP and a direction in which the charging station 500 is located based on the docking information. Thus, as shown in FIG. 7E, the robot 100 may switch the traveling direction to the direction in which the charging station 500 is located, and thus, move to the charging station 500. Accordingly, as the traveling direction of the main body 10 is directed toward a front of the charging station 500, the main body 10 may dock on the front of the charging station 500. In this case, the robot 100 may move for the predetermined distance r for which the robot 100 moved when the robot 100 departed from the charging station 500.

As such, when the robot 100 switches the traveling direction based on the reception result and the sensing result and moves to the charging station 500, the robot 100 may move within a predetermined range with reference to the charging station 500. For example, as shown in FIG. 8, the robot 100 may move so that the target movement point P corresponds to a predetermined range R with reference to the charging station 500. That is, when the robot 100 moves to the charging station 500, the robot 100 may move to the charging station 500 by applying a predetermined offset to the target movement point P so that the target movement point P corresponds to the predetermined range R with reference to the charging station 500. Accordingly, when the robot 100 is to move to the charging station 500, the robot 100 may move to a position corresponding to the predetermined range R with reference to the charging station 500. The robot 100 may move to a position corresponding to the predetermined range R, and then, move from the position corresponding to the predetermined range R to the charging station 500 along the boundary area 1200 of the travel area 1000. The robot 100 may be located at the position corresponding to the predetermined range R, then, detect the boundary area 1200 within the predetermined range R, and thus, move to the charging station 500 along the boundary area 1200. For example, the controller 20 may detect the wire 1200 installed in the boundary area 1200 to form the boundary area 1200, and thus, move along the wire 1200 and dock on the charging station 500. That is, the robot 100 may move into the predetermined range R by applying a predetermined offset to a setting of the target movement point P to move to the charging station 500, Then, the robot 100 may detect the boundary area 1200 within the predetermined range R, and thus, move to the charging station 500 along the boundary area 1200.

The above-described embodiments of the system 1 may be applied to the moving robot described above and a method for moving the moving robot to a charging station which is to be described below. In addition, embodiments of the moving robot and the method for moving the moving robot to a charging station may be applied to the system 1.

Hereinafter, a method for moving to a charging station of a moving robot according to the present disclosure (hereinafter referred to as a moving method) will be described.

The moving method is a method in which, in the system 1, the robot 100 moves to the charging station 500, wherein the system 1 is shown in FIG. 1A and the robot 100 is shown in FIGS. 1B to 1D. The moving method may be applied to the robot 100 and the system 1.

The moving method may be a method for controlling movement of the robot 100 in the system 1.

The moving method may be a control method performed by the controller 20 included in the robot 100.

The moving method is a method for moving to the charging station 500 in the sequence shown in FIGS. 7A to 7E, the moving being performed by the robot 100, wherein the robot includes the main body 10, the driving unit 11 that moves the main body 10, the receiver 12 that receives a plurality of transmission signals transmitted from the charging station 500 in the travel area 1000, the sensing unit 13 that senses a magnetic field state at a position in which the main body 10 is located, and the controller 20 that controls traveling of the main body 10 by controlling the driving unit 11 to travel in the travel area 1000 based on at least one selected from a reception result obtained by the receiver 12, a sensing result obtained by the sensing unit 13, and an area map that is pre-stored. The moving method may be applied to a method in which the controller 20 controls traveling of the robot 100 or a method in which, in the system 1, the robot 100 moves to the charging station 500.

As shown in FIG. 8, the moving method includes moving for the predetermined distance r after departing from the charging station 500 (S10), storing docking information regarding the docking point OP based on the reception result and the sensing result at the one point OP to which the predetermined distance r is moved (S20), determining a traveling direction and a direction in which the docking point OP is located, based on the reception result, the sensing result, and the docking information obtained at a current position, after traveling in the travel area 1000 (S30), moving to the docking point OP by switching the traveling direction to the direction in which the docking point OP is located (S40), determining the traveling direction and the direction in which charging station 500 is located based on the docking information at the docking point OP (S50), and moving to the charging station 500 by switching the traveling direction to the direction in which the charging station 500 is located (S60).

That is, the robot 100 may return to the charging station 500 in an order from the moving for the predetermined distance r (S10), the storing of the docking information (S20), the determining of the direction in which the docking point OP is located (S30), the moving to the docking point OP (S40), the determining of the direction in which the charging station 500 is located (S50), to the moving to the charging station 500 (S60).

In the step (S10) of moving for the predetermined distance r. when the robot docks on the charging station 500, the robot may start traveling by departing from the charging station 500.

In the step (S10) of moving for the predetermined distance r, as shown in FIG. 7A, the robot 100 may move backward from the charging station 500 by the predetermined distance r and be located at the one point OP in a state when the robot 100 is directed toward the charging station 500.

That is, in the step (S10) of moving for the predetermined distance r, the robot 100 may move backward by the predetermined distance r when the robot 100 docks on the charging station 500, that is, when a traveling direction is directed toward the charging station 500, and thus, the robot 100 may be located at the one point OP spaced apart from the charging station 500 by the predetermined distance r.

In the step (S20) of storing the docking information, the robot 100 arrive at the one point OP, set the docking point OP based on the reception result and the sensing result obtained at the one point OP, and store the docking information regarding the docking point OP.

In the step (S20) of storing the docking information, the robot 100 may store, in the docking information, the reception result as to the plurality of transmission signals and the sensing result as to the magnetic field state.

In the step (S20) of storing the docking information, the robot 100 analyzes a direction of the magnetic field MF according to the traveling direction from the sensing result, sets the one point OP as the docking point OP, and then, stores, in the docking information, an analysis result obtained by analyzing the sensing result and the sensing result.

In the step (S30) of determining a direction in which the docking point OP is located, the robot 100 may determine the traveling direction and the direction in which the docking point OP is located based on the reception result, the sensing result, and the docking information at the current position, while the robot 100 is traveling in the travel area 1000.

In the step (S30) of determining the direction in which the docking point OP is located, the robot 100 may check a direction in which a reception angle of the plurality of transmission signals corresponds to predetermined criteria based on the reception result at the current position, and determine the checked direction as the direction in which the charging station 500 is located.

In the step (S30) of determining the direction in which the docking point OP is located, as shown in FIG. 7B, the robot 100 may determine a direction, in which a difference between reception angles of the first transmission signal and the second transmission signal at the current position is less than predetermined criteria, as the direction in which the charging station 500 is located.

In the step (S30) of determining the direction in which the docking point OP is located, the robot 100 may determine the traveling direction at the current position based on the sensing result obtained at the current position.

In the step (S30) of determining the direction in which the docking point OP, the robot 100 may determine the traveling direction and the direction in which the docking point OP is located based on the docking information.

In the step (S30) of determining the direction in which the docking point OP is located, the robot 100 may determine the direction in which the charging station 500 is located and the traveling direction based on the reception result and the sensing result obtained at the current position, and determine the direction in which the docking point OP is located based on the docking information.

In the step (S40) of moving to the docking point OP, the robot 100 may move to the docking point OP by switching the traveling direction to the direction in which the docking point OP is located, based on a result of the determination as to the traveling direction and a result of the determination as to the direction in which the docking point OP is located.

In the step (S40) of moving to the docking point OP, the robot 100 may switch the traveling direction to the direction in which the docking point OP is located as shown in FIG. 7C, move to the docking point OP when the traveling direction is switched to the docking point OP, and then, be located to the docking point OP as shown in FIG. 7D.

In the step (S40) of moving to the docking point OP, the robot 100 may compare the sensing result with the analysis result stored in the docking information while the robot 100 is moving to the docking point OP, and move to the docking point OP according to the analysis result.

In the step (S40) of moving to the docking point OP, the robot 100 may check a point at which the sensing result corresponds to the analysis result, that is, a point at which the sensing result matches the direction of the magnetic field MF at the current position while the robot 100 moves to the docking point OP, and then, move to the docking point OP.

In the step (S50) of determining the direction in which the charging station 500, the robot 100 may determine the traveling direction and the direction in which the charging station 500 is located based on the docking information obtained at the docking point OP.

In the step (S50) of determining of the direction in which the charging station 500 is located, the robot 100 may determine the traveling direction and the direction in which the charging station 500 is located when the robot 100 is located at the docking point OP, as shown in FIG. 7D.

In the step (S60) of moving to the charging station 500, the robot 100 may move to the charging station 500 by switching the traveling direction to the determined direction in which the charging station 500 is located.

In the step (S60) of moving to the charging station 500, the robot 100 may switch the traveling direction to the direction in which the charging station 500 is located, move to the charging station 500 when the robot is directed toward a front of the charging station 500, and dock on the charging station 500, as shown in FIG. 7E.

In the step (S60) of moving to the charging station 500, the robot 100 may move to the charging station 500 in correspondence with the predetermined distance r for which the robot 100 moved after departing for the charging station 500, and dock on the charging station 500.

The moving method can be implemented as computer-readable codes on a program-recorded medium, wherein the moving method includes the moving for the predetermined distance r (S10), the storing of the docking information (S20), the determining of the direction in which the docking point OP is located (S30), the moving to the docking point OP (S40), the determining of the direction in which the charging station 500 is located (S50), and the moving to the charging station 500 (S60). The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 20.

The above-described embodiments of the moving robot, the moving robot system, and the method for moving the moving robot to the charging station according to the present disclosures may be implemented independently or in a combination of one or more embodiments. In addition, the above-described embodiments may be applied to a control element of the moving robot, the moving robot system. a control system of the moving robot, a method for controlling the moving robot, a method for moving the moving robot to the charging station of the moving robot, and a method for controlling moving of the moving robot to the charging station, in a combination of specific embodiments. In particular, the above-described embodiments may be usefully applied to a lawn mower robot, a control system of a lawn mower robot, a method for controlling moving of the moving robot, a method for returning the lawn mower robot to the charging station, etc., and implemented.

While the present disclosure has been particularly shown and described with reference to embodiments thereof, it will be understood that various changes in form and details may be made therein without departing from the spirit and scope of the present disclosure as defined by the following claims. Therefore, the scope of the present disclosure is defined not by the detailed description of the embodiments, but by equivalents of the appended claims as well as the appended claims.

While the present disclosure has been particularly shown and described with reference to exemplary embodiments, described herein, and drawings, it may be understood by one of ordinary skill in the art that various changes and modifications thereof may be made. Accordingly, the scope of the present disclosure should be defined by the following claims, and various changes equal or equivalent to the claims pertain to the category of the concept of the present disclosure.

What is claimed is:

1. A moving robot that cuts grass while traveling in a travel area which is an outdoor area formed as a boundary area, the moving robot comprising:
 a main body;
 a driving part to move the main body;
 a receiver to receive a plurality of transmission signals
  transmitted from a charging station in the travel area;

at least one sensor to sense a magnetic field state at a point at which the main body is located; and a controller to control traveling of the main body by controlling the driving part to travel in the travel area, based on at least one selected from a reception result obtained by the receiver, a sensing result obtained by the at least one sensor, and a pre-stored area map, wherein the controller, when the controller controls the main body to move to the charging station, determines a direction in which the charging station is located based on the reception result at a current position of the main body, determines a traveling direction of the main body based on the sensing result at the current position, and controls the main body to move to the charging station according to a result of the determination as to the direction in which the charging station is located and the traveling direction, wherein the controller controls the main body to move from the current position to a docking point, based on pre-stored docking information regarding the docking point, and move from the docking point into a predetermined range with reference to the charging station, wherein while the main body is moving from the current position to the docking point, the controller determines a point corresponding to the docking point based on the reception result and the sensing result and controls the main body to move to the docking point based on a determination result of the docking point, and wherein the controller detects the boundary area of the travel area within the predetermined range and controls the main body to move to the charging station along the boundary area.

2. The moving robot of claim 1, wherein the charging station comprises a plurality of signal transmission modules, and the plurality of signal transmission modules transmit the plurality of transmission signals, respectively.

3. The moving robot of claim 1, wherein the at least one sensor is configured to sense at least one of a direction of a magnetic field and strength of the magnetic field at the point at which the main body is located.

4. The moving robot of claim 3, wherein the at least one sensor comprises a magnetic field sensor.

5. The moving robot of claim 1, wherein the controller compares reception results as to the plurality of transmission signals at the current position with each other and determines the direction in which the charging station is located according to a result of the comparison.

6. The moving robot of claim 1, wherein the controller analyzes a direction of a magnetic field at the current position from the sensing result at the current position, and determines the traveling direction of the main body according to a result of the analysis.

7. The moving robot of claim 1, wherein the controller controls the main body to move to the charging station, by switching the traveling direction to the direction in which the charging station is located according to the result of the determination as to the direction in which the charging station is located and the traveling direction.

8. The moving robot of claim 1, wherein the controller stores, as the docking information, information of one point to which the main body departed from the charging station and moved a predetermined distance.

9. The moving robot of claim 8, wherein the controller stores, in the docking information, information regarding the reception result and the sensing result at the one point.

10. The moving robot of claim 9, wherein the controller determines the traveling direction of the main body and a direction in which the docking point is located based on the docking information and controls the main body to move to the docking point by switching the traveling direction to the direction in which the docking point is located, when the controller controls the main body to move from the current position to the docking point.

11. The moving robot of claim 9, wherein the controller determines the traveling direction of the main body and the direction in which the charging station is located based on the docking information and controls the main body to move to the charging station by switching the traveling direction to the direction in which the charging station is located, when the controller controls the main body to move from the docking point to the charging station.

12. A moving robot system comprising:

a charging station that is provided in a travel area which is an outdoor area formed as a boundary area, and transmits a plurality of transmission signals to determine position information; and a moving robot to travel and to cut grass in the travel area based on at least one of a reception result obtained by receiving the plurality of transmission signals, a sensing result obtained by sensing a magnetic field state, and a pre-stored area map, wherein the moving robot, when the moving robot moves to the charging station, determines a direction in which the charging station is located based on the reception result obtained at a current position of the moving robot, determines a traveling direction based on the sensing result obtained at the current position, and moves to the charging station according to a result of the determination as to the direction in which the charging station is located and the traveling direction, wherein the moving robot moves from the current position to a docking point based on pre-stored docking information regarding the docking point, and moves from the docking point into a predetermined range with reference to the charging station, and wherein while the main body is moving from the current position to the docking point, the controller determines a point corresponding to the docking point based on the reception result and the sensing result and controls the main body to move to the docking point based on a determination result of the docking point.

13. The moving robot system of claim 12, wherein the charging station comprises a plurality of signal transmission modules, and the plurality of signal transmission modules transmit the plurality of transmission signals, respectively.

14. The moving robot system of claim 12, wherein the moving robot moves to the charging station by switching the traveling direction to the direction in which the charging station is located, according to the result of the determination as to the direction in which the charging station is located and the traveling direction.

15. The moving robot system of claim 12, wherein the moving robot detects the boundary area of the travel area within the predetermined range, and moves to the charging station along the boundary area.

16. A method for moving to a charging station of a moving robot that cuts grass while traveling in a travel area which is an outdoor area formed as a boundary area, wherein the moving robot comprises:

a main body;

a driving part to move the main body;

a receiver to receive a plurality of transmission signals transmitted from the charging station provided in the travel area;

at least one sensor to sense a magnetic field state at a point at which the main body is located; and a controller to control traveling of the main body by controlling the driving part to travel in the travel area, based on at least one selected from a reception result obtained by the receiver, a sensing result obtained by the at least one sensor, and a pre-stored area map, the method comprising:

moving a predetermined distance after departing from the charging station;

storing docking information regarding a docking point based on the reception result and the sensing result at one point to which movement by the predetermined distance is performed;

determining a traveling direction and a direction in which the docking point is located based on the reception result, the sensing result, and the docking information at a current position, after traveling is performed in the travel area;

moving to the docking point by switching the traveling direction to the direction in which the docking point is located;

determining the traveling direction and the direction in which the charging station is located based on the docking information at the docking point; and moving to the charging station by switching the traveling direction to the direction in which the charging station is located, wherein in the moving to the docking point, the controller determines a point corresponding to the docking point based on the reception result and the sensing result and controls the main body to move to the docking point based on a determination result of the docking point.

* * * * *